United States Patent
Sato et al.

(10) Patent No.: US 6,532,309 B1
(45) Date of Patent: Mar. 11, 2003

(54) PICTURE DECODING METHOD AND APPARATUS

(75) Inventors: Kazushi Sato, Kanagawa (JP); Naofumi Yanagihara, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/450,614

(22) Filed: Nov. 30, 1999

(30) Foreign Application Priority Data

Dec. 1, 1998 (JP) .......................................... 10-342113

(51) Int. Cl.[7] .................................................. G06K 9/36
(52) U.S. Cl. .................. 382/248; 382/233; 375/240.16; 375/240.22
(58) Field of Search ................................ 382/232, 250; 348/556–558; 375/240.16, 240.22

(56) References Cited

U.S. PATENT DOCUMENTS 5,995,677 A * 11/1999 Jones .......................... 382/232
6,016,165 A * 1/2000 Baek et al. .................. 348/441
6,025,878 A * 2/2000 Boyce et al. ........... 375/240.16
6,111,989 A * 8/2000 Chang et al. ................ 382/250

* cited by examiner

Primary Examiner—Jingge Wu
(74) Attorney, Agent, or Firm—Frommer Lawrence & Haug LLP; William S. Frommer

(57) ABSTRACT

In a pixel decoding method and apparatus, pixel dephasing caused for the field DCT mode and the frame DCT mode is to be eliminated to curtail the processing volume without detracting from the properties inherent in a picture produced on interlaced scanning. To this end, if the DCT mode is the field mode, a decimating DCT device for field mode 14 performs 4×4 decimating IDCT. If the DCT mode is the frame mode, the decimating DCT device for frame mode 15 performs IDCT on the totality of coefficients of the DCT block, separates the coefficients into two pixel blocks associated with the interlaced scanning and performs DCT separately for the separated two pixel blocks. The low frequency components of these two pixel blocks are IDCT and the two pixel are synthesized.

8 Claims, 36 Drawing Sheets

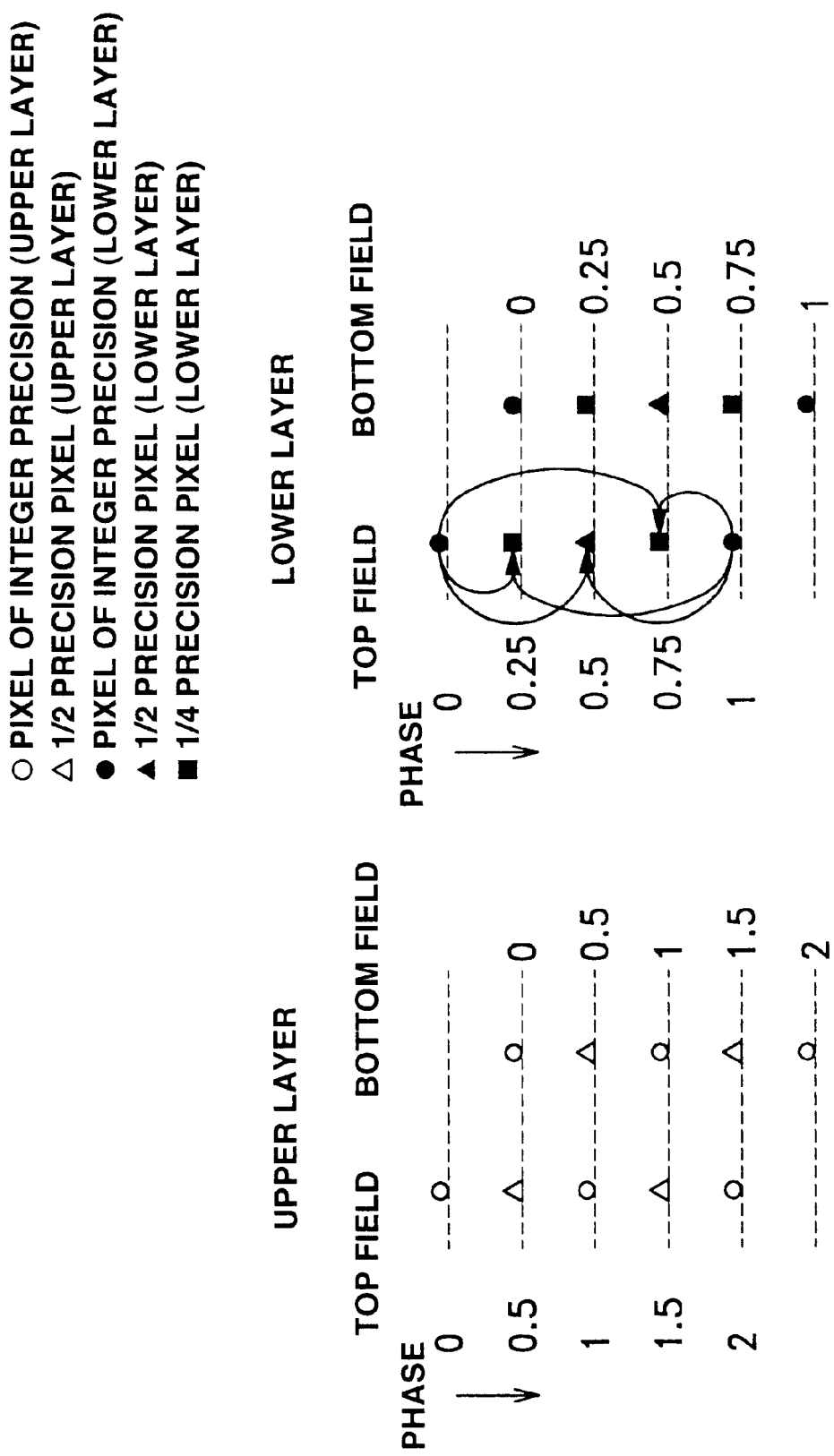

| 0 | 1 | 5 | 6 | 14 | 15 | 27 | 28 |
|---|---|---|---|---|---|---|---|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

FIG.18

| 0 | 4 | 6 | 20 | 22 | 36 | 38 | 52 |
|---|---|---|---|---|---|---|---|
| 1 | 5 | 7 | 21 | 23 | 37 | 39 | 53 |
| 2 | 8 | 19 | 24 | 34 | 40 | 50 | 54 |
| 3 | 9 | 18 | 25 | 35 | 41 | 51 | 55 |
| 10 | 17 | 26 | 30 | 42 | 46 | 56 | 60 |
| 11 | 16 | 27 | 31 | 43 | 47 | 57 | 61 |
| 12 | 15 | 28 | 32 | 44 | 48 | 58 | 62 |
| 13 | 14 | 29 | 33 | 45 | 49 | 59 | 63 |

FIG.19

| 0 | 1 | 5 | 6 | 14 | 15 | 27 | 28 |
|---|---|---|---|---|---|---|---|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

FIG.20

| 0 | 4 | 6 | 20 | 22 | 36 | 38 | 52 |
|---|---|---|---|---|---|---|---|
| 1 | 5 | 7 | 21 | 23 | 37 | 39 | 53 |
| 2 | 8 | 19 | 24 | 34 | 40 | 50 | 54 |
| 3 | 9 | 18 | 25 | 35 | 41 | 51 | 55 |
| 10 | 17 | 26 | 30 | 42 | 46 | 56 | 60 |
| 11 | 16 | 27 | 31 | 43 | 47 | 57 | 61 |
| 12 | 15 | 28 | 32 | 44 | 48 | 58 | 62 |
| 13 | 14 | 29 | 33 | 45 | 49 | 59 | 63 |

FIG.21

| 0 | 1 | 5 | 6 | 14 | 15 | 27 | 28 |
|---|---|---|---|----|----|----|----|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

FIG.22

| 0 | 4 | 6 | 20 | 22 | 36 | 38 | 52 |
|---|---|---|----|----|----|----|----|
| 1 | 5 | 7 | 21 | 23 | 37 | 39 | 53 |
| 2 | 8 | 19 | 24 | 34 | 40 | 50 | 54 |
| 3 | 9 | 18 | 25 | 35 | 41 | 51 | 55 |
| 10 | 17 | 26 | 30 | 42 | 46 | 56 | 60 |
| 11 | 16 | 27 | 31 | 43 | 47 | 57 | 61 |
| 12 | 15 | 28 | 32 | 44 | 48 | 58 | 62 |
| 13 | 14 | 29 | 33 | 45 | 49 | 59 | 63 |

|  |  |  |  |  |  |  |  |
|---|---|---|---|---|---|---|---|
| 0 | 1 | 5 | 6 | 14 | 15 | 27 | 28 |
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

FIG.30

|  |  |  |  |  |  |  |  |
|---|---|---|---|---|---|---|---|
| 0 | 1 | 5 | 6 | 14 | 15 | 27 | 28 |
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

FIG.31

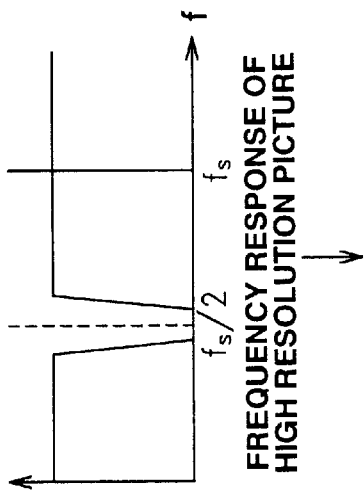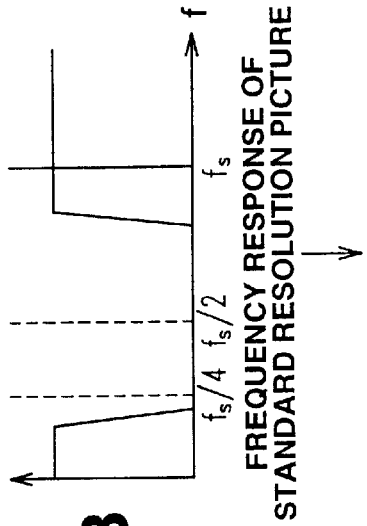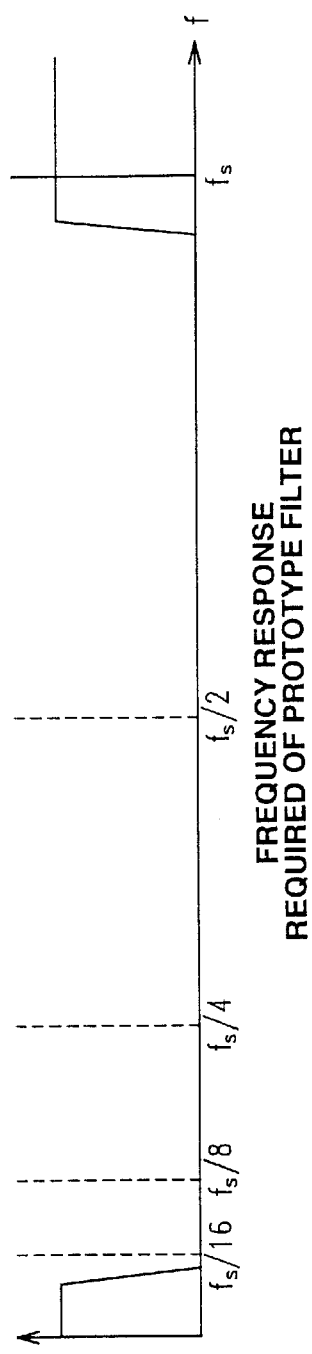

GAIN LIST = {1,1,1,1,0,0,0,0,0,0,0,0,0,0,0,0,0,0,0,0,0,0,0,0,0,0,0,0,0,}

GAIN LIST = {1,1,0,0,0,0,0,0,0,0,0,0,0,}

PICTURE DECODING METHOD AND APPARATUS

BACKGROUND OF THE INVENTION

1. Field of the Invention

This invention relates to a picture decoding method and apparatus for decoding compressed picture data of a first resolution, obtained on predictive coding by motion prediction in terms of a pre-set pixel block (macro-block) as a unit, and on orthogonal transforming in terms of a pre-set pixel block (orthogonal transform block) as a unit. More particularly, it relates to a picture decoding method and apparatus for decoding compressed picture data of the first resolution and for decimating the data to moving picture data of a second resolution lower than the first resolution.

2. Description of the Related Art

There is now going on the standardization of digital television signals employing the picture compression system, such as Moving Picture Experts Group Phase 2 (MPEG2). Among the standards for digital television broadcast, there are a standard for standard resolution pictures, such as those with the number of effective lines in the vertical direction of 576, and a standard for high-resolution pictures, such as those with the number of effective lines in the vertical direction of 1152. Recently, there is raised a demand for a downdecoder for decoding compressed picture data of a high-resolution picture and for reducing the resolution of the compressed picture data by ½ to generate picture data of the picture data of standard resolution to display the picture data on a television monitor designed to cope with the standard resolution.

There is proposed in a publication entitled "Scalable Decoder free of Low-Range Drift" (written by Iwahashi, Kanbayashi and Takaya, Shingaku-Gihou CS94-186, DSP 94-108, 1995-01) a downdecoder for decoding a bitstream of, for example, MPEG2, obtained on predictive coding with motion prediction of a high-resolution picture and compression coding by discrete cosine transform, and for downsampling the picture to a picture of standard resolution. This Publication, referred to below as Publication 1, shows the following first to third downdecoders.

Referring to FIG. 1, this first downdecoder includes an inverse discrete cosine transform unit 1001, for processing a bitstream of a high resolution picture with 8 (number of coefficients as counted from the dc component in the horizontal direction)×8 (number of coefficients as counted from the dc component in the vertical direction), an adder 1002 for adding a discrete cosine transformed high resolution picture and a motion-compensated reference picture, and a frame memory 1003 for transient storage of the reference picture. The first downdecoder also includes a motion compensation unit 1004 for motion-compensating the reference picture stored in the frame memory 1003 with ½ pixel precision, and a downsampling unit 1005 for converting the reference picture stored in the frame memory 1003 to a picture of standard resolution.

This first downdecoder reduces an output picture, obtained on decoding as a high resolution picture by inverse discrete cosine transform, by the downsampling unit 1005, to output resulting picture data with the standard resolution.

Referring to FIG. 2, the second downdecoder includes an inverse discrete cosine transform unit 101 for performing 8×8 inverse discrete cosine transform, as it substitutes 0 for the high-frequency components of the discrete cosine transform (DCT) block of the high resolution picture, an adder 1012 for summing the discrete cosine transformed high resolution picture to the motion-compensated reference picture, and a frame memory 1013 for transient storage of the reference picture. The second downdecoder also includes a motion compensation unit 1014 for motion-compensating the reference picture stored in the frame memory 1013 with ½ pixel precision, and a downsampling unit 1015 for converting the reference picture stored in the frame memory 1013 to a picture of standard resolution.

This second downdecoder performs inverse discrete cosine transform to obtain a decoded output picture, as a high-resolution picture, as it substitutes 0 for coefficients of high-frequency components among the totality of coefficients of the DCT block, and reduces the output picture in size by the downsampling unit 1015 to output picture data of standard resolution.

Referring to FIG. 3, a third downdecoder includes a decimating inverse discrete cosine transform unit 102 for doing e.g., 4×4 inverse discrete cosine transform, using only the coefficients of the low-frequency components of the DCT block of the bitstream of the high resolution picture, for decoding to a standard resolution picture, and an adder 1022 for summing the standard resolution picture processed with decimating inverse discrete cosine transform and the motion-compensated reference picture. The third downdecoder also includes a frame memory 1023 for transiently storing the reference picture and a motion compensation unit 1024 for motion-compensating the reference picture stored by the frame memory 1023 with a ¼ pixel precision.

In this third downdecoder, IDCT is executed using only low-frequency components of all coefficients of the DCT block to decode a picture of low resolution from a picture of high resolution.

The above-described first downdecoder performs inverse discrete cosine transform on the totality of the coefficients in the DCT block to obtain a high-resolution picture on decoding. Thus, the inverse discrete cosine transform unit 1001 of high processing capability and the frame memory 1003 of high capacity are needed. The second downdecoder performs discrete cosine transform on the coefficients in the DCT block to obtain a high-resolution picture on decoding, as it sets the high-frequency components of the coefficients to zero, so that a lower processing capacity of the inverse discrete cosine transform unit 1011 suffices. However, the frame memory 1003 of high capacity is yet needed. In contradistinction from these first and second downdecoders, the third downdecoder performs inverse discrete cosine transform on the totality of the coefficients in the DCT block, using only coefficients of the low-frequency components of the coefficients in the DCT block, so that a low processing capability of an inverse discrete cosine transform unit 1021 suffices. Moreover, since the reference picture of the standard resolution picture is decoded, a lower capacity of the frame memory 1023 suffices.

Meanwhile, the display system of a moving picture in television broadcast is classified into a sequential scanning system and an interlaced scanning system. The sequential scanning system sequentially displays a picture obtained on sampling the totality of pictures in a given frame at the same timing. The interlaced scanning system alternately displays pictures obtained on sampling pixels in a given frame at different timings from one horizontal line to another.

In this interlaced scanning system, one of the pictures obtained on sampling pixels in a frame at different timings from one horizontal line to another is termed a top field or a first field, with the other picture being termed a bottom field or a second field. The picture containing the leading line in the horizontal direction of a frame becomes the top field, while the picture containing the second line in the horizontal direction of a frame becomes the bottom field. Thus, in the interlaced scanning system, a sole frame is made up of two fields.

With the MPEG2, not only a frame but also a field can be allocated to a picture as a picture compressing unit in order to compress the moving picture signals efficiently in the interlaced scanning system.

If, in the MPEG2, a field is allocated to a picture, the resulting bitstream structure is termed a field structure, while if a frame is allocated to a picture, the resulting bitstream structure is termed a frame structure. In the field structure, a DCT block is constituted by pixels in the field and discrete cosine transform is applied on the field basis. The processing mode of performing field-based discrete cosine transform is termed the field DCT mode. In the frame structure, a DCT block is constituted by pixels in the frame and discrete cosine transform is applied on the frame basis. The processing mode of performing field-based discrete cosine transform is termed the frame DCT mode. In the field structure, a macro-block is constituted from pixels in a field and motion prediction is performed on the field basis. The processing mode of performing motion prediction on the field basis is termed the field motion prediction mode. In the frame structure, a macro-block is constituted from pixels in a frame and motion prediction is performed on the frame basis. The processing mode of performing motion prediction on the frame basis is termed the frame motion prediction mode.

Meanwhile, a picture decoding apparatus, adapted for decoding compressed picture data for the interlaced scanning system, using the third downdecoder shown in the Publication 1, is proposed in, for example, a Publication entitled in "A Compensation Method of Drift Errors in Scalability" written by N. Obikane, K. Tahara and J. Yonemitsu, HDTV Work Shop '93. This Publication is hereinafter termed the Publication 2.

Referring to FIG. 4, the conventional picture decoding device, shown in Publication 2, includes a bitstream analyzer 1031, fed with a bitstream obtained on compressing a high resolution picture in accordance with the MPEG2, for analyzing this bitstream, a variable length encoding/decoding unit 1032 for variable length encoding data for allocating codes of lengths corresponding to the data occurrence frequency and for decoding the variable length encoded bitstream, and a dequantizer 1033 for multiplying the respective coefficients of the DCT block with quantization steps. The conventional picture decoding device also includes a decimating inverse discrete cosine transform unit 1034 for decoding a standard resolution picture by e.g., 4×4 inverse discrete cosine transform using only coefficients of low-frequency components of the totality of the coefficients of the DCT block, and an adder 1035 for summing the standard resolution picture processed with decimating inverse discrete cosine transform to a motion-compensated reference picture. The conventional picture decoding device also includes a frame memory 1036 for transiently storing the reference picture and a motion compensation unit 1037 for motion compensating the reference picture stored in the frame memory 1036 to a ¼ pixel precision.

The decimating inverse discrete cosine transform unit 1034 of the conventional picture decoding device, shown in the Publication 2, performs the inverse discrete cosine transform, using only the coefficients of the low-frequency components of the totality of the coefficients in the DCT block. It is noted that the positions of the coefficients of the frame DCT mode, processed with the inverse discrete cosine transform, differ from those of the field DCT mode.

Specifically, in the field DCT mode, the decimating inverse discrete cosine transform 1034 applies the inverse discrete cosine transform only on the 4×4 of 8×8 coefficients in the DCT block, as shown in FIG. 5. On the other hand, in the frame DCT mode, the decimating inverse discrete cosine transform 1034 applies the inverse discrete cosine transform only on the 4×2+4×2 of 8×8 coefficients in the DCT block, as shown in FIG. 6.

Also, the motion compensation unit 1037 of the conventional picture decoding device performs motion compensation to ¼ pixel precision, adapted to cope with the field motion prediction mode or with the frame motion prediction mode, based on the information (motion vector) on the motion prediction performed on the high resolution picture. Specifically, while the MPEG2 usually provides that the motion compensation be performed to ½ pixel precision, the number of pixels in a picture is thinned out to one-half if a standard resolution picture is to be decoded from a high resolution picture. Thus, the motion compensation unit 1037 performs motion compensation as it sets the pixel precision for motion compensation to ¼ pixel.

Therefore, the motion compensation device 1037 performs linear interpolation on the pixels of the reference picture stored in the frame memory 1036 as a standard resolution picture to generate pixels to a ¼ pixel accuracy.

Specifically, the processing for linear interpolation of pixels in the perpendicular direction for the field motion prediction mode and that for the frame motion prediction mode are explained with reference to FIGS. 7A, 7B, 8A and 8B, in which the phase of pixels in the vertical direction is indicated in the perpendicular direction, with the phase of each pixel in a displayed picture being indicated by an integer.

Referring to FIGS. 7A, 7B, the processing for interpolation of a picture motion-predicted in the field motion prediction mode is explained. For a high resolution picture (upper layer), motion compensation is independently performed to a ½ pixel precision, from field to field, as shown in FIG. 7A. On the other hand, for a standard resolution picture (lower layer), motion compensation is achieved by generating pixels dephased by ¼, ½ and ¾ pixel in the perpendicular direction by linear interpolation in a field based on the pixel of an integer number precision, as shown in FIG. 7B. That is, in the standard resolution picture (lower layer), pixels with ¼ pixel precision of the top field are generated by linear interpolation based on the pixels of the integer number precision of the top field, while those with ¼ pixel precision of the bottom field are generated by linear interpolation based on the pixels of the integer number precision of the bottom field. It is assumed for example that the value of a pixel of the top field, having the phase in the perpendicular direction at the 0-position, is a, with the value of a pixel having the phase in the perpendicular direction at the 1-position is b. In this case, the pixel of the top field with the phase in the perpendicular direction of ¼ is (3a+b)/4, while the pixel of the top field with the phase in the perpendicular direction of ½ is (a+b)/2, with the pixel of the top field with the phase in the perpendicular direction of ¾ being (a+3b)/4.

Referring to FIG. 8, the processing of interpolation of a picture motion-predicted in the frame motion prediction mode is explained. For a high resolution picture (upper layer), interpolation processing is performed across the fields, that is across the bottom field and the top field, as shown in FIG. 8A, with the motion compensation precision being ½ pixel precision. For a standard resolution picture (lower layer), motion compensation is achieved by generating pixels dephased by ¼, ½ and ¾ pixels in the perpendicular direction, based on the pixels of the integer number precision of two fields, that is the top field and the bottom field, as shown in FIG. 8B. For example, it is assumed that the value of a pixel of the bottom field having the phase in the perpendicular direction of −1 is a, the value of a pixel of the top field having the phase in the perpendicular direction of 0 is b, the value of a pixel of the bottom field having the phase in the perpendicular direction of 1 is c, the value of a pixel of the top field having the phase in the perpendicular direction of 2 is d, and a pixel of the top field having the phase in the perpendicular direction of 3 is e. In this case, the pixels of ¼ pixel precision, having the phase in the perpendicular direction in a range from 0 and 2, may be found as follows:

The pixel having the phase in the perpendicular direction of ¼ is (a+4b+3c)/8. while the pixel having the phase in the perpendicular direction of ½ is (a+3c)/4. The pixel having the phase in the perpendicular direction of ¾ is (a+2b+3c+2d)/8, while the pixel having the phase in the perpendicular direction of 5/4 is (2b+3c+2d+e )/8. The pixel having the phase in the perpendicular direction of 3/2 is (3c+e)/4, while the pixel having the phase in the perpendicular direction of 7/4 is (3c+4d+e)/8.

With the above-described picture decoding device, disclosed in the Publication 2, the compressed picture data of the high resolution picture, associated with the interlaced scanning system, can be decoded to standard resolution picture.

However, with the conventional picture decoding device, shown in the above Publication 2, the pixels of the standard resolution picture obtained with the field DCT mode are dephased with respect to the pixels of the standard resolution obtained with the frame DCT mode. Specifically, with the field DCT mode, the phases of the pixels in the perpendicular direction of the respective pixels of the top field of the lower layer are ½, 5/2, . . . , with the phases in the perpendicular direction of the respective pixels of the bottom field of the lower layer being 1, 3, . . . , as shown in FIGS. 9A, 9B. On the other hand, with the field DCT mode, the phases of the pixels in the perpendicular direction of the respective pixels of the top field of the lower layer are 0, 2, . . . , with the phases in the perpendicular direction of the respective pixels of the bottom field of the lower layer being 1, 3, . . . , as shown in FIGS. 10A, 10B. Thus, pictures with different phases co-exist in the frame memory 1036, thus deteriorating the picture quality of the output picture.

With the conventional picture decoding device, shown in the Publication 2, correction is not made of phase deviations or dephasing of the pixels at the time of the motion compensation with the field motion prediction mode and the frame motion prediction mode resulting in the deteriorated picture quality.

SUMMARY OF THE INVENTION

It is therefore an object of the present invention to provide a picture decoding method and apparatus for decoding standard resolution picture data from compressed picture data of the high resolution picture with a reduced processing volume, whereby phase deviation of pixels by the field orthogonal transform mode and frame orthogonal transform mode may be eliminated without detracting from properties inherent in a picture obtained on interlaced scanning.

In one aspect, the present invention provides a picture decoding apparatus for decoding, from compressed picture data of a first resolution, moving picture data of a second resolution lower than the first resolution, the compressed picture data of the first resolution having been obtained by predictive coding by performing motion prediction in terms of a pre-set pixel block (macro-block) as a unit and orthogonal transform in terms of a pre-set pixel block (macro-block) as a unit, wherein the apparatus includes variable length decoding means for variable length decoding compressed picture data of the first resolution, obtained on back-scanning respective coefficients in the orthogonal transform block in accordance with a pre-set scanning system, and inverse orthogonal transform means for inverse orthogonal transforming the coefficients of low frequency components of coefficients of the orthogonal transform blocks of variable length decoded compressed picture data. The variable length decoding means variable length decodes coefficients of up to the highest frequency components of the coefficients of the low frequency components, to be inverse orthogonal transformed by the inverse orthogonal transform means, with the variable length decoding means not variable length decoding the coefficients of higher frequency components.

In another aspect, the present invention provides a picture decoding apparatus for decoding, from compressed picture data of a first resolution, moving picture data of a second resolution lower than the first resolution, the compressed picture data of the first resolution having been obtained by predictive coding by performing motion prediction in terms of a pre-set pixel block (macro-block) as a unit and orthogonal transform in terms of a pre-set pixel block (macro-block) as a unit, wherein the apparatus includes variable length decoding means for variable length decoding compressed picture data of the first resolution, obtained on back-scanning respective coefficients in the orthogonal transform block in accordance with a pre-set scanning system, and inverse orthogonal transform means for inverse orthogonal transforming the coefficients of low frequency components of coefficients of the orthogonal transform blocks of variable length decoded compressed picture data. The variable length decoding means variable length decodes coefficients of up to the highest frequency components of the coefficients of the low frequency components, to be inverse orthogonal transformed by the inverse orthogonal transform means, with the variable length decoding means not variable length decoding the coefficients of higher frequency components and setting to zero the coefficients, which have not been variable length decoded and which are to be inverse orthogonal transformed by the inverse orthogonal transform means.

With the present picture decoding apparatus, up to the highest frequency components of the coefficients of the low frequency components, to be inverse orthogonal transformed the coefficients of higher frequency components, are variable length decoded, while the coefficients, which have not been variable length decoded and which are to be inverse orthogonal transformed, are set to zero.

In still another aspect, the present invention provides a picture decoding method for decoding, from compressed picture data of a first resolution, moving picture data of a second resolution lower than the first resolution, the compressed picture data of the first resolution having been obtained by predictive coding by performing motion prediction in terms of a pre-set pixel block (macro-block) as a unit and orthogonal transform in terms of a pre-set pixel block (macro-block) as a unit, wherein the method includes variable length decoding compressed picture data of the first resolution, obtained on back-scanning respective coefficients in the orthogonal transform block in accordance with a pre-set scanning system, and inverse orthogonal transforming the coefficients of low frequency components of coefficients of the orthogonal transform blocks of variable length decoded compressed picture data, and wherein, up to the highest frequency components of the coefficients of the low frequency components, to be inverse orthogonal transformed by the inverse orthogonal transform means, are variable length decoded, with the coefficients of higher frequency components not being decoded.

With the present picture decoding method, up to the highest frequency components of the coefficients of the low frequency components, to be inverse orthogonal transformed by the inverse orthogonal transform means, are variable length decoded, with the coefficients of higher frequency components not being decoded.

In yet another aspect, the present invention provides a picture decoding method for decoding, from compressed picture data of a first resolution, moving picture data of a second resolution lower than the first resolution, the compressed picture data of the first resolution having been obtained by predictive coding by performing motion prediction in terms of a pre-set pixel block (macro-block) as a unit and orthogonal transform in terms of a pre-set pixel block (macro-block) as a unit, wherein the method includes variable length decoding compressed picture data of the first resolution, obtained on back-scanning respective coefficients in the orthogonal transform block in accordance with a pre-set scanning system, and inverse orthogonal transforming the coefficients of low frequency components of coefficients of the orthogonal transform blocks of variable length decoded compressed picture data, and wherein up to the highest frequency components of the coefficients of the low frequency components, to be inverse orthogonal transformed by the inverse orthogonal transform means, are decoded. The coefficients of higher frequency components are not decoded and the coefficients, which have not been variable length decoded and which are to be inverse orthogonal transformed by the inverse orthogonal transform means, are set to zero.

With the present picture decoding apparatus, up to the highest frequency components of the coefficients of the low frequency components, to be inverse orthogonal transformed the coefficients of higher frequency components, are variable length decoded, while the coefficients, which have not been variable length decoded and which are to be inverse orthogonal transformed, are set to zero.

With the picture decoding method and apparatus according to the present invention, up to the coefficients of the maximum frequency components of coefficients of the low frequency components to be IDCT are variable length decoded, whilst coefficients of higher frequencies are not variable length decoded. This enables the processing volume to be reduced by not variable length decoding redundant information not decoded on the occasion of the decimating IDCT.

Also, with the picture decoding method and apparatus according to the present invention, up to the coefficients of the maximum frequency components of coefficients of the low frequency components to be IDCTed are variable length decoded, whilst coefficients of higher frequencies are not variable length decoded. The coefficients not variable length decoded and which are to be inverse orthogonal transformed are set to zero. This enables the processing volume to be reduced in accordance with the processing capacity as the picture quality is prohibited from being lowered.

In the picture decoding method and apparatus, decimating IDCT is performed with certain coefficients of the frequency components in the vertical direction of an orthogonal transform block being set to zero. This enables the processing volume to be decreased as picture deterioration is suppressed to a minimum.

BRIEF DESCRIPTION OF THE DRAWINGS

FIGS. 7A, 7B illustrate the linear interpolation processing in the field prediction mode of the conventional picture decoding apparatus.

FIG. 18 illustrates an example of coefficients with which the variable length decoding apparatus scans in case the DCT block is DCTed in the field DCT mode and the scanning system is zigzag scan.

FIG. 19 illustrates an example of coefficients with which the variable length decoding apparatus scans in case the DCT block is DCTed in the field DCT mode and the scanning system is alternate scan.

FIG. 20 illustrates an example of coefficients with which the variable length decoding apparatus scans in case the DCT block is DCTed in the frame DCT mode and the scanning system is zigzag scan.

FIG. 21 illustrates an example of coefficients with which the variable length decoding apparatus scans in case the DCT block is DCTed in the frame DCT mode and the scanning system is alternate scan.

FIG. 22 illustrates another example of coefficients with which the variable length decoding apparatus scans in case the DCT block is DCTed in the field DCT mode and the scanning system is zigzag scan.

FIG. 23 illustrates another example of coefficients with which the variable length decoding apparatus scans in case the DCT block is DCTed in the field DCT mode and the scanning system is alternate scan.

FIG. 24 illustrates an example of coefficients with which the variable length decoding apparatus scans in case the DCT block is DCTed in the frame DCT mode and the scanning system is zigzag scan.

FIG. 25 illustrates another example of coefficients with which the variable length decoding apparatus scans in case the DCT block is DCTed in the frame DCT mode and the scanning system is alternate scan.

FIG. 30 shows an example of coefficients with which the variable length decoding apparatus scans in case of processing in association with the decimating IDCT apparatus for the frame mode.

FIG. 31 shows another example of coefficients with which the variable length decoding apparatus scans in case of processing in association with the decimating IDCT apparatus for the frame mode.

FIGS. 37A, 37B and 37C illustrate the frequency response of a prototype filter required in designing the 4×8 phase-correcting IDCT matrix.

DESCRIPTION OF THE PREFERRED EMBODIMENTS

Figure 1:
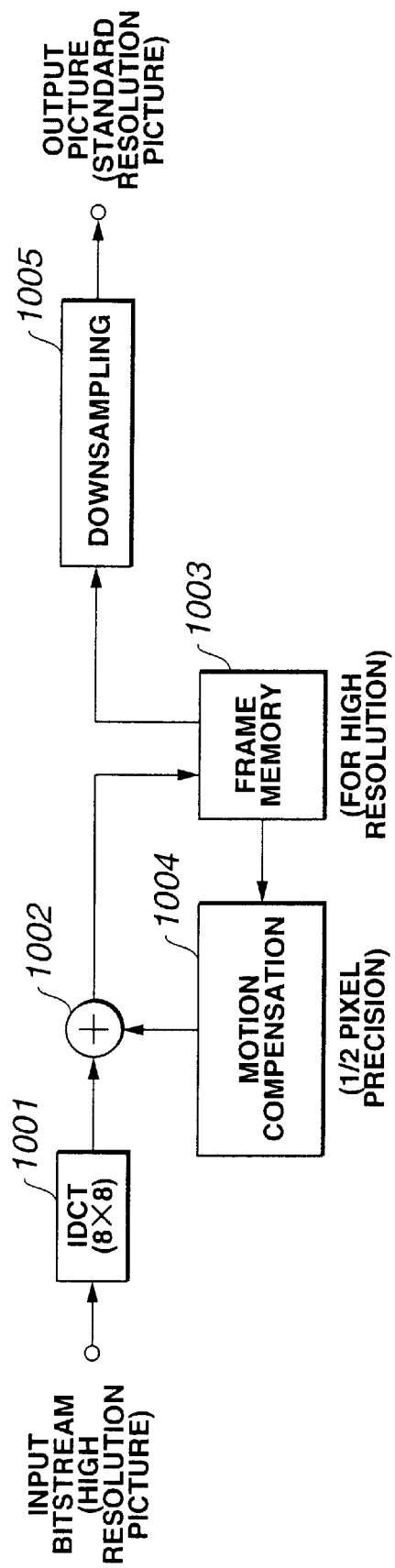
FIG. 1 is a block diagram showing a conventional first downdecoder.
Figure 2:
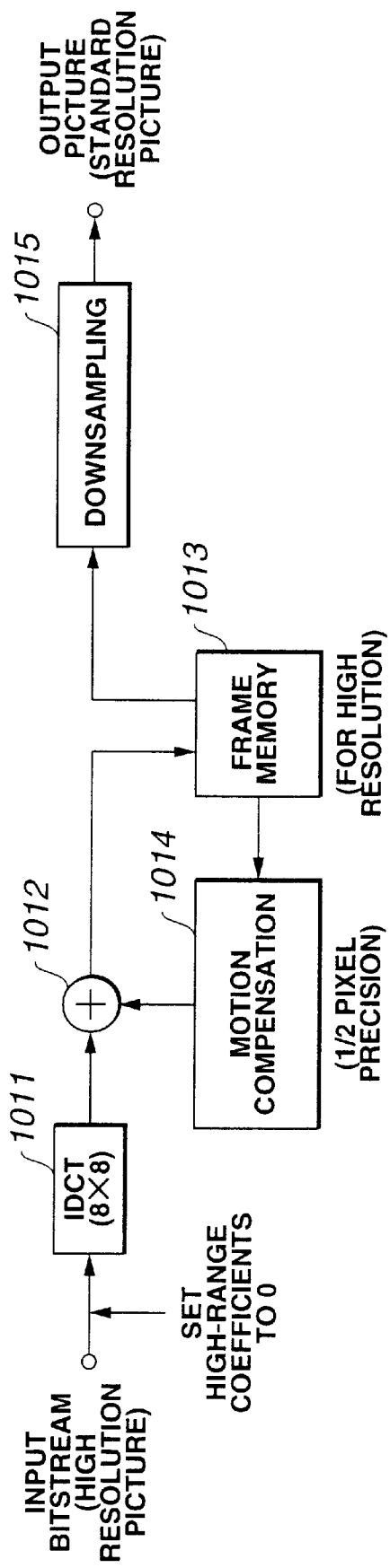
FIG. 2 is a block diagram showing a conventional second downdecoder.
Figure 3:
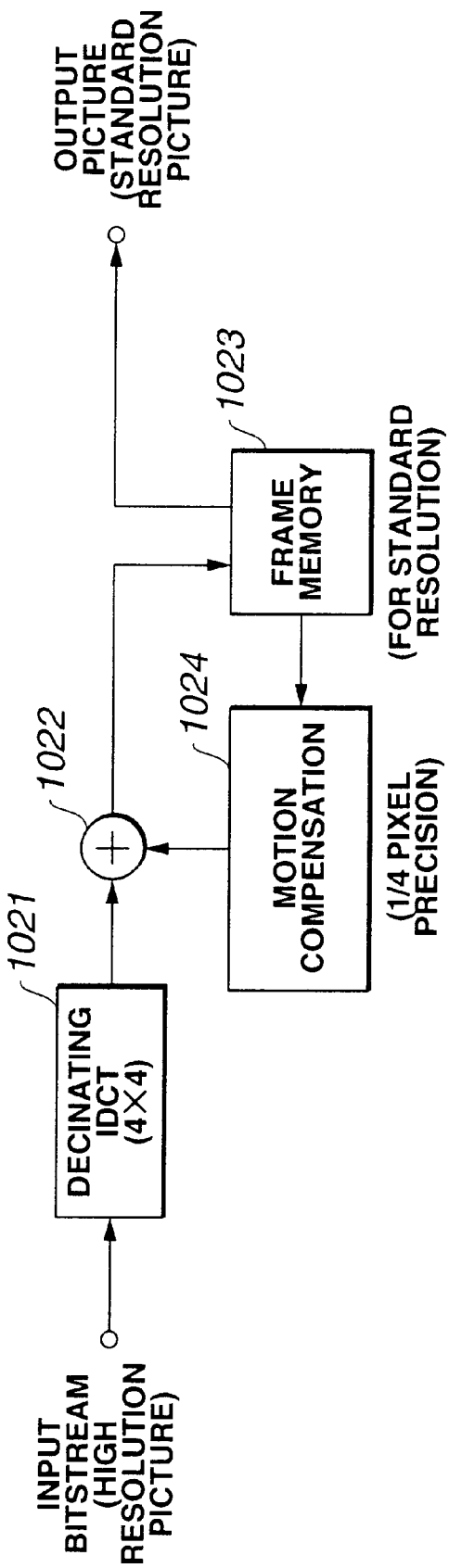
FIG. 3 is a block diagram showing a conventional third downdecoder.

Referring to the drawings, preferred embodiments of a picture decoding device according to the present invention will be explained in detail.

First Embodiment

First, a picture decoding device according to a first embodiment of the present invention is explained.

Figure 11:
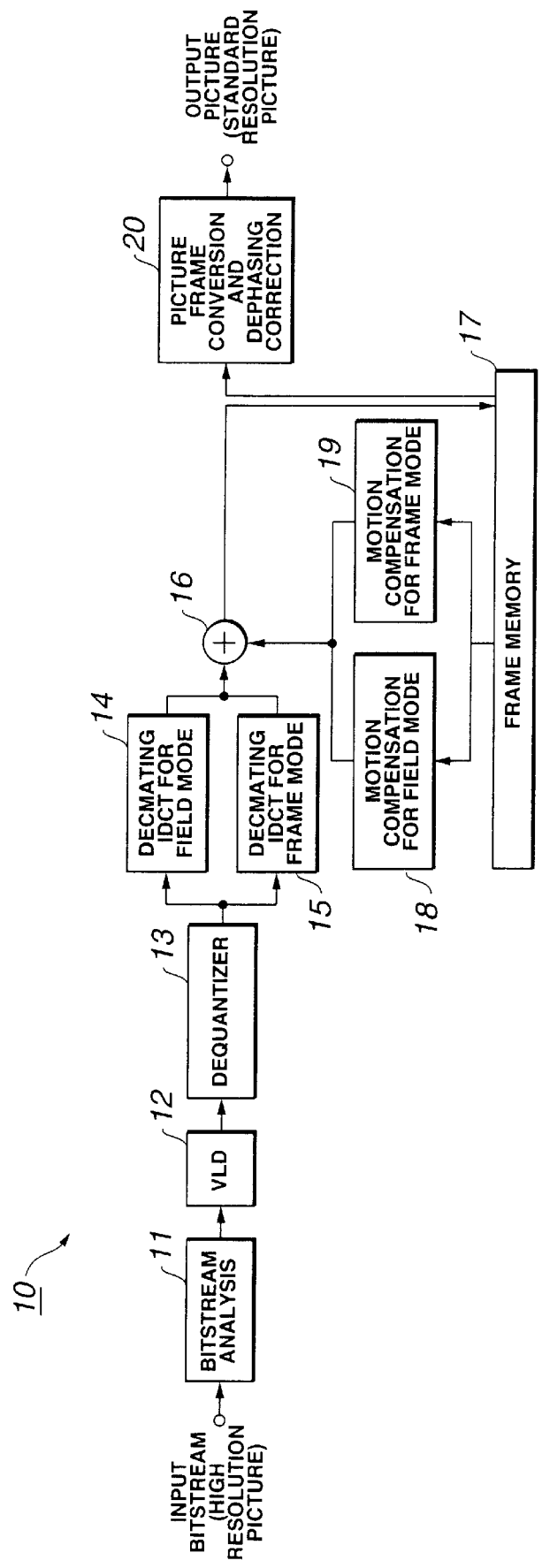
FIG. 11 is a block diagram of a picture decoding apparatus according to a first embodiment of the present invention.

Referring to FIG. 11, a picture decoding device 10 of the first embodiment of the present invention is designed and constructed so that a bitstream obtained on compressing a high resolution picture with the number of effective lines in the vertical direction of, for example, 1152, by MPEG2, is entered as an input, with the input bitstream being decoded and decimated to a resolution of ½ to output a standard resolution picture with the number of effective lines in the vertical direction of, for example, 576.

In the following explanation of the embodiments of the present invention, a high resolution picture is termed an upper layer and a standard resolution picture is termed a lower layer. It is noted that, if a DCT block having 8×8 discrete cosine coefficients is inverse discrete cosine transformed, there result decoded data made up of 8×8 pixels. The processing of inverse discrete cosine transform processing and simultaneously reducing the resolution, such as decoding 8×8 discrete cosine coefficients to obtain decoded data made up of 4×4 pixels, is termed the decimating inverse discrete cosine transform.

This picture decoding device 10 includes a bitstream analysis unit 11, fed with a bitstream of a compressed high resolution picture and adapted for analyzing the input bitstream, and a variable length decoding unit 12 for decoding the bitstream, processed with variable length encoding of allocating a code length associated with the data occurrence frequency. The picture decoding device 10 also includes a dequantizer 13 for multiplying the coefficients of the DCT block with quantization steps and a decimating inverse discrete cosine transform unit 14 for decimating inverse discrete cosine transforming the DCT block discrete cosine transformed with the field DCT mode to generate a standard resolution picture. The picture decoding device 10 also includes a decimating inverse discrete cosine transform unit for frame mode 15 for decimating inverse discrete cosine transforming the DCT block discrete cosine transformed in the frame DCT mode and an adder 16 for summing the decimating inverse discrete cosine transformed standard resolution picture to the motion compensated reference picture. The picture decoding device 10 also includes a frame memory 17 for temporarily storing the reference picture and a motion compensation unit for field mode 18 for motion compensating the reference picture stored in the frame memory 17 in meeting with the field motion predictive mode. The picture decoding device 10 also includes a motion compensation unit for frame mode 19 for motion compensating the reference picture stored in the frame memory 17 in meeting with the frame motion predictive mode, and a picture frame converting dephasing correction unit 20 for post-filtering a picture stored in the frame memory 17 for picture frame conversion and for correcting the dephasing of pixels for display on a television monitor etc.

The variable length decoding unit 12 is responsive to the scanning system of the input DCT block to back-scan the coefficients in the DCT block to decode the variable length codes. The scanning system in the DCT block is classified into, for example, a zigzag scan and alternate scan. This scanning system is analyzed by the upstream side bitstream analysis unit 11.

The processing in the variable length decoding unit 12 will be explained subsequently in detail.

Figure 5:
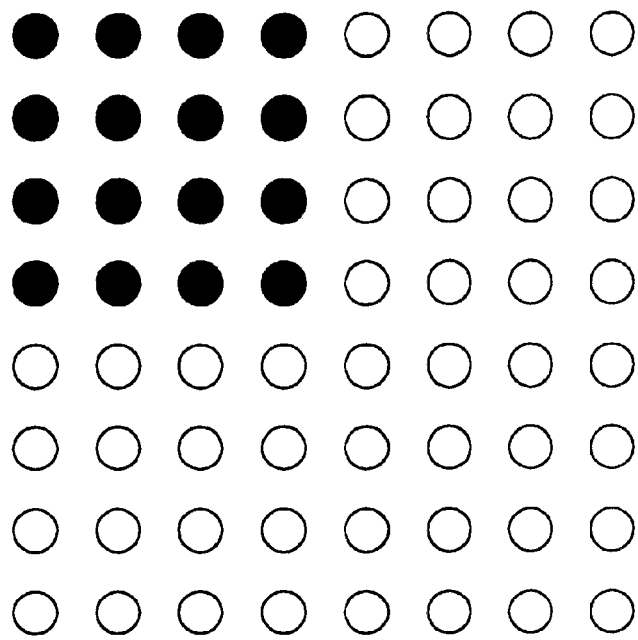
FIG. 5 illustrates the decimating IDCT processing in the field DCT mode of the conventional picture decoding apparatus.
Figure 6:
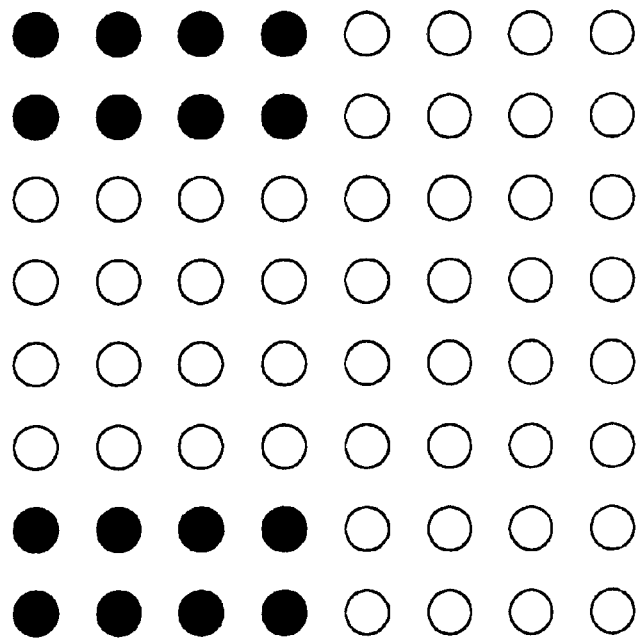
FIG. 6, similarly to FIG. 5, illustrates the decimating IDCT processing in the field DCT mode of the conventional picture decoding apparatus.
Figures 8A, 8B:
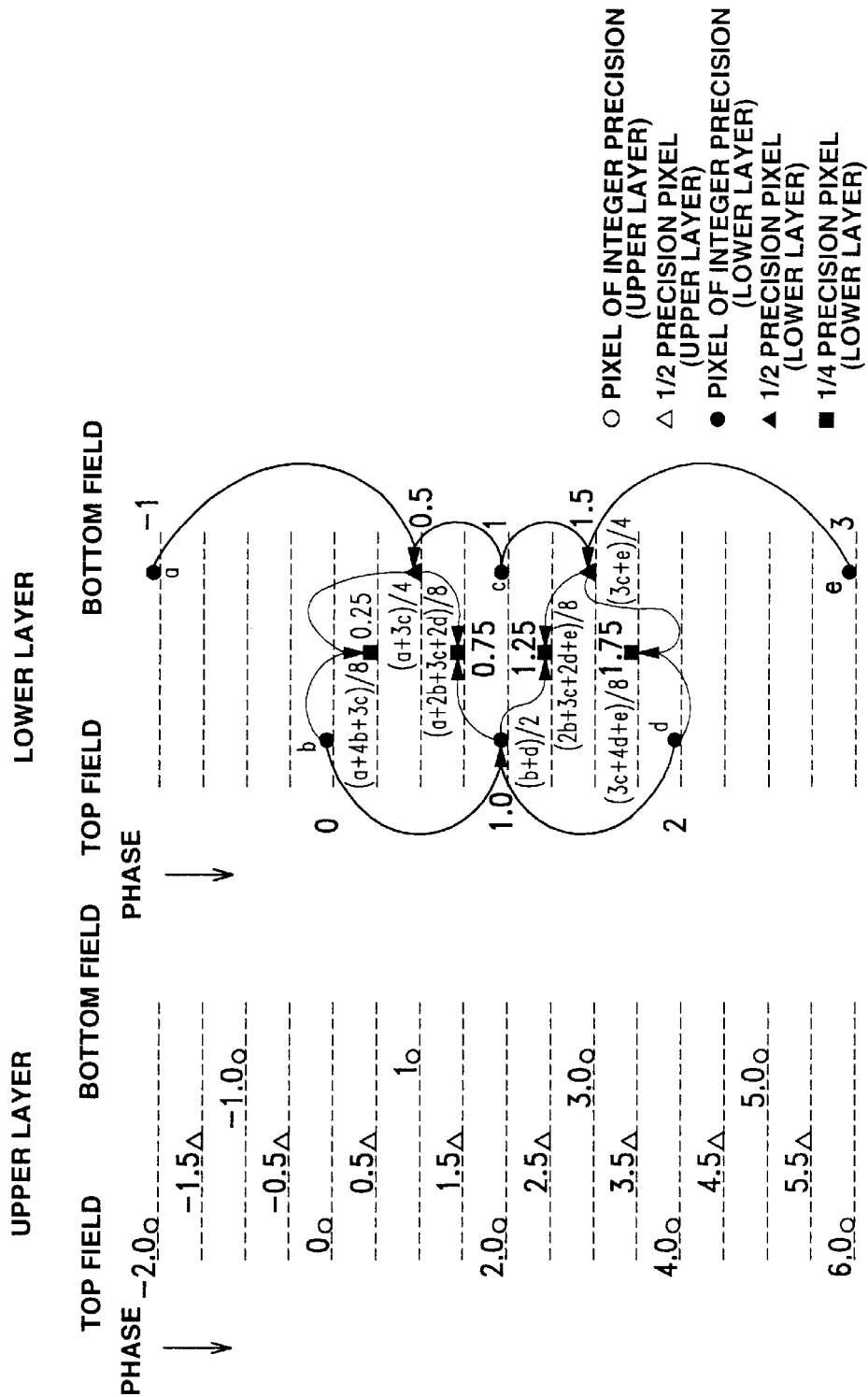
FIGS. 8A, 8B illustrate the linear interpolation processing in the frame prediction mode of the conventional picture decoding apparatus.
Figures 9A, 9B:
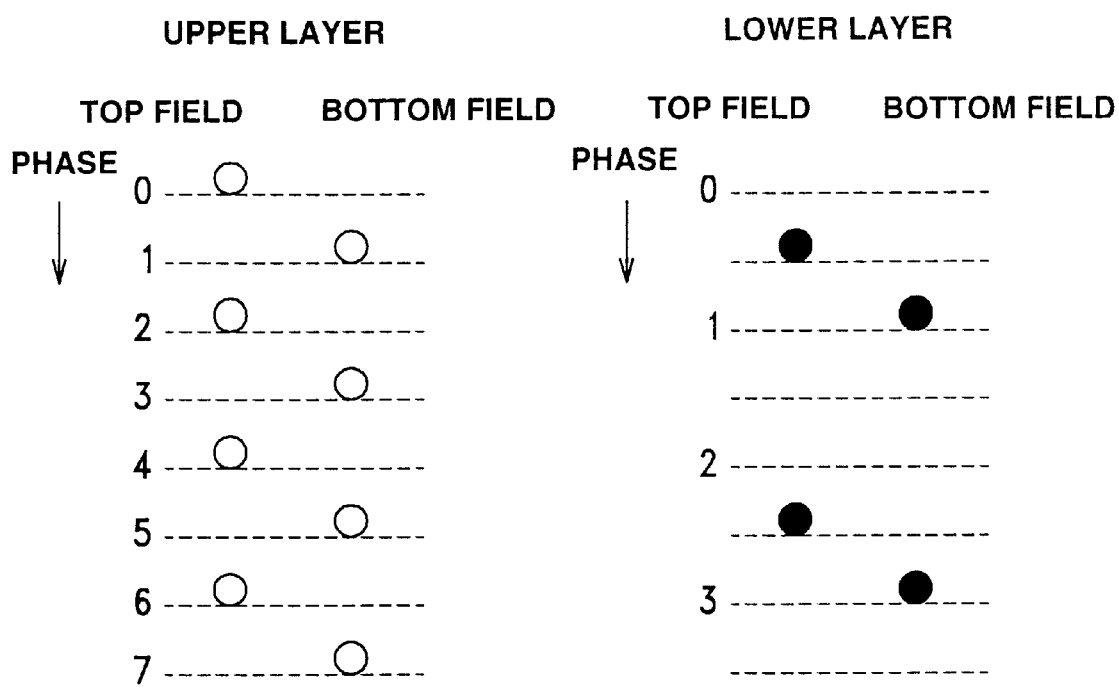
FIGS. 9A, 9B illustrate the phase of pixels obtained for the field DCT mode of the conventional picture decoding apparatus.
Figures 12A, 12B:
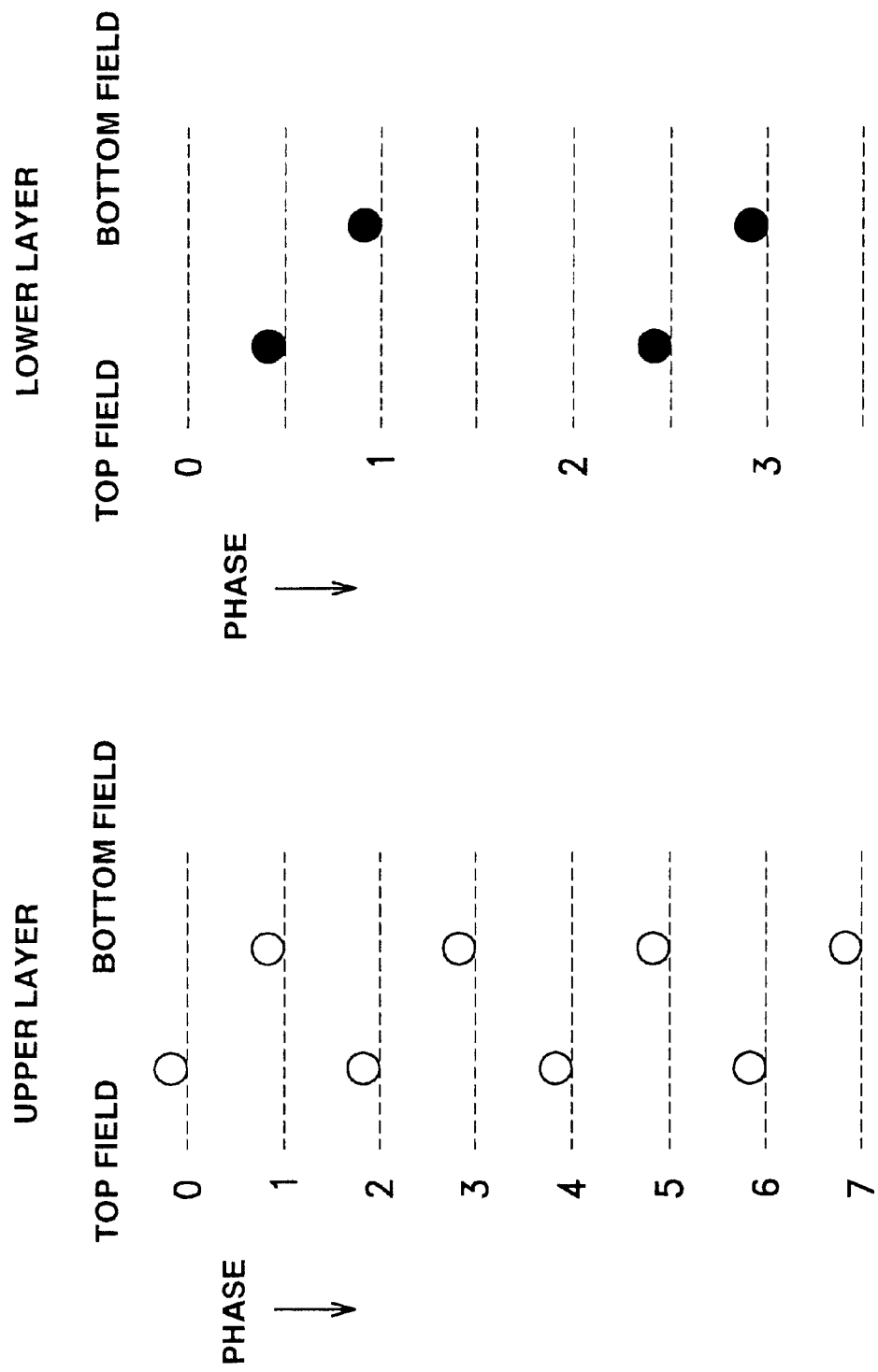
FIG. 12 illustrates the phase of pixels in the vertical direction of a reference picture stored in a frame memory of the first embodiment of the picture decoding apparatus.

The decimating inverse discrete cosine transform unit 14 for field mode is used if the macro-block of an input bitstream is discrete cosine transformed in the field DCT mode. The decimating inverse discrete cosine transform unit 14 for field mode performs inverse discrete cosine transform only on the low-range 4×4 coefficients of the DCT block, showing 8×8 coefficients in the macro-block discrete cosine transformed in the field DCT mode, as shown in FIG. 5. That is, the decimating inverse discrete cosine transform unit 14 for field mode performs decimating inverse discrete cosine transform based on four point inverse discrete cosine coefficients in the horizontal direction and in the vertical direction. This decimating inverse discrete cosine transform unit 14 for field mode can decode the standard resolution picture, each DCT block of which is made up of 4×4 pixels, by the above-described decimating inverse discrete cosine transform. The phases of the pixels of the decoded picture data are ½, 2, . . . , in the per direction of the respective pixels of the top field, with the phases in the perpendicular direction of the respective pixels of the bottom field being 1, 3, . . . , as shown in FIG. 12. That is, in the top field of the decoded lower layer, the phase of the leading end pixel (pixel with the phase of ½) is intermediate between the first and second pixels (pixels with the phase 0 and the phase 2) as from the leading end of the top field of the upper layer, while the phase of the second pixel as from the leading end pixel (pixel with the phase of 2/5) is intermediate between the third and fourth pixels (pixels with the phase 4 and the phase 6) as from the leading end of the top field of the upper layer. On the other hand, in the bottom field of the decoded lower layer, the phase of the leading end pixel (pixel with the phase of 1) is intermediate between the first and second pixels (pixels with the phase 1 and the phase 3) as from the leading end of the bottom field of the upper layer, whereas the phase of the second pixel as from the leading end pixel (pixel with the phase of 3) is intermediate between the third and fourth pixels (pixels with the phase 5 and the phase 7) as from the leading end of the bottom field of the upper layer.

The decimating inverse discrete cosine transform unit for frame mode 15 is used when the macro-block of the input bitstream is discrete cosine transformed with the frame DCT mode. The decimating inverse discrete cosine transform unit for frame mode 15 performs decimating inverse discrete cosine transform on the DCT block showing 8×8 coefficients in the macro-block discrete cosine transformed in the frame DCT mode. The decimating inverse discrete cosine transform unit for frame mode 15 decodes the standard resolution picture, each DCT block of which is constituted by 4×4 pixels, while generating a picture of the same phase as the phase of the pixel of the standard resolution picture generated by the decimating inverse discrete cosine transform unit 14. That is, the phases in the perpendicular direction of the respective pixels of picture data decoded by the decimating inverse discrete cosine transform unit for frame mode 15 are such that the phases in the perpendicular direction of respective pixels of the top field are ½, 5/2, . . . , with the phases in the perpendicular direction of the respective pixels of the bottom field being 1, 3, . . . , as shown in FIG. 12.

The processing by the decimating inverse discrete cosine transform unit for frame mode 15 will be explained subsequently in detail.

If a macro-block decimating inverse discrete cosine transformed by the decimating inverse discrete cosine transform unit 14 or by the decimating inverse discrete cosine transform unit for frame mode 15 is an intra-picture, the adder 16 directly stores the intra-picture in the frame memory 17. If a macro-block decimating inverse discrete cosine transformed by the decimating inverse discrete cosine transform unit 14 or by the decimating inverse discrete cosine transform unit for frame mode 15 is an inter-picture, the adder 16 synthesizes the reference picture, motion compensated by the motion compensation unit for field mode 18 or by the motion compensation unit for frame mode 19, to the inter-picture, to store the synthesized picture in the frame memory 17.

The motion compensation unit for field mode 18 is used if the motion prediction mode for the macro-block is the field motion prediction mode. The motion compensation unit for field mode 18 performs interpolation, in a form which takes into account dephasing components between the top and bottom fields, on the reference picture of the standard resolution stored in the frame memory 17, to effect motion compensation in the field motion prediction mode. This reference picture motion compensated by this motion compensation unit for field mode 18 is sent to the adder 16 so as to be synthesized to an inter-picture.

The motion compensation unit for frame mode 19 is used when the macro-block motion prediction mode is the frame motion prediction mode. The motion compensation unit for frame mode 19 performs interpolation, in a form which takes into account dephasing components between the top and bottom fields, on the reference picture of the standard resolution stored in the frame memory 17, to effect motion compensation in the frame motion prediction mode. This reference picture motion compensated by this motion compensation unit for frame mode 19 is sent to the adder 16 so as to be synthesized to an inter-picture.

The picture frame converting dephasing correction unit 20 is fed with the standard resolution reference picture stored in the frame memory 17, or with the picture synthesized by the adder 16, and corrects the picture by post-filtering for phase deviation between the top and bottom fields, while converting the picture frame in meeting with the standard of the standard resolution television. Specifically, the picture frame converting dephasing correction unit 20 corrects the standard resolution picture, with the phases of the pixels of the top field in the perpendicular direction being ½, 5/2, . . . and with the phases in the perpendicular direction of the respective pixels of the bottom field being 1, 3, . . . , so that the phases in the perpendicular direction of the respective pixels of the top field will be 0, 2, 4, . . . and so that the phases in the perpendicular direction of the respective pixels of the bottom field will be 1, 3, 5, . . . The picture frame converting dephasing correction unit 20 also reduces the picture frame of the standard for high resolution television to ¼ for conversion to a picture frame of the standard for standard resolution television.

With the picture decoding device 10 of the first embodiment of the present invention, having the above-described structure, it is possible to decode a bitstream, obtained on picture compression of a high resolution picture by the MPEG2, and to reduce the resolution to ½, in order to output a standard resolution picture.

Figure 13:
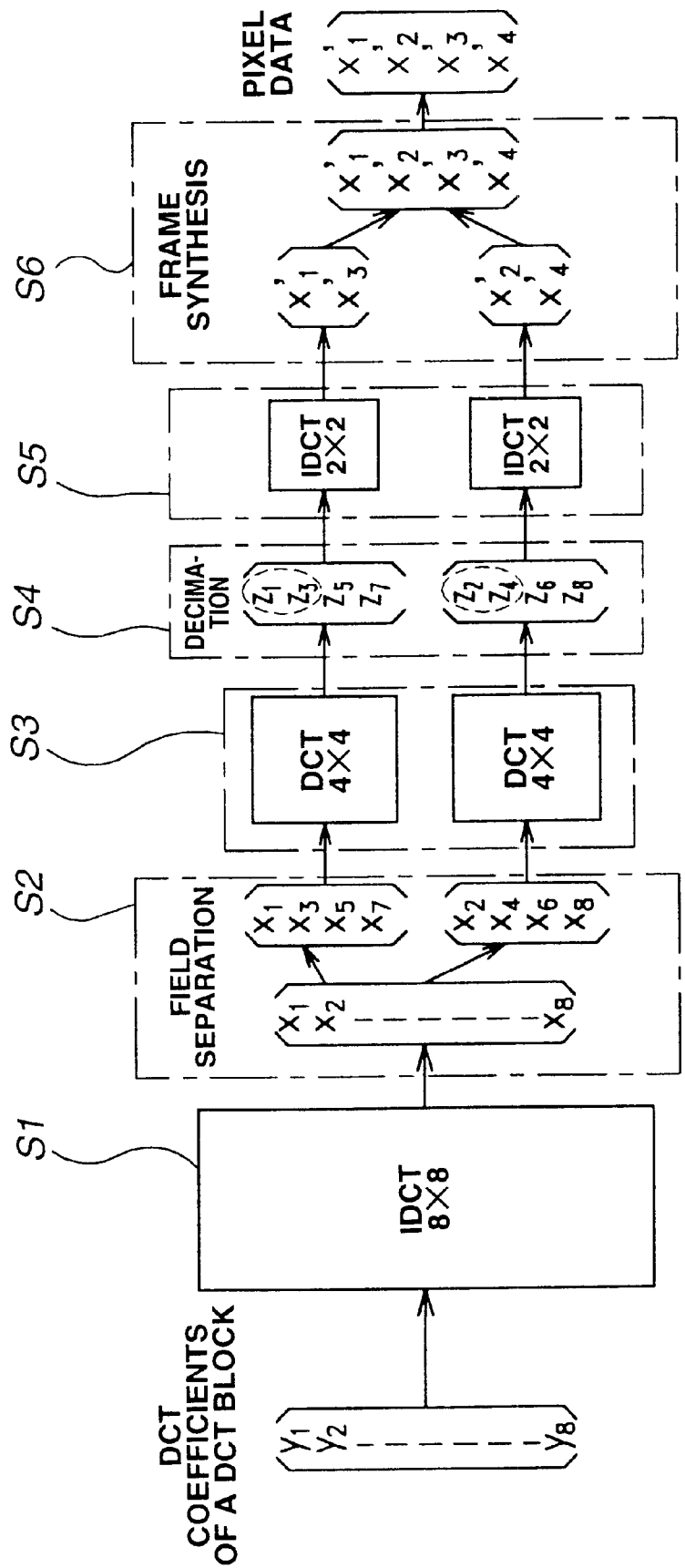
FIG. 13 illustrates the processing of the decimating IDCT apparatus for the frame mode of the first embodiment of picture decoding apparatus.

The decimating inverse discrete cosine transform unit for frame mode 15 is fed with a bitstream, obtained on compression encoding a high resolution picture, in terms of a DCT block as a unit, as shown in FIG. 13.

First, at step S1, 8×8 inverse discrete cosine transform (IDCT 8×8) is performed on the discrete cosine coefficients y of the DCT block. The coefficients in the perpendicular direction, among the totality of the discrete cosine coefficients of the DCT block, are indicated as $y_1$ to $y_8$ in the drawing. By this inverse discrete cosine transform, 8×8 decoded pixel data x are produced. It is noted that pixel data in the perpendicular direction of the totality of pixel data of the DCT block are indicated as $x_1$ to $x_8$ in the drawing.

At the next step S2, the 8×8 pixel data are retrieved alternately on the line basis in the perpendicular direction, and are separated into two pixel blocks, namely a pixel block of the 4×4 top field in meeting with the interlaced scanning and a pixel block of the 4×4 bottom field in meeting with the interlaced scanning. That is, the pixel data $x_1$ on the first line, pixel data $x_3$ on the third line, pixel data $x_5$ on the fifth line and pixel data $x_7$ on the seventh line in the vertical direction are retrieved to generate a pixel block for the top field. On the other hand, the pixel data $x_2$ on the second line, pixel data $x_4$ on the fourth line, pixel data $x_6$ on the sixth line and pixel data $x_8$ on the eighth line in the vertical direction are retrieved to generate a pixel block for the bottom field. The processing for separating pixels of a DCT block into two pixel blocks in meeting with the interlaced scanning is referred to below as field separation.

Then, at step S3, each of the two pixel blocks, resulting from field separation, is processed with 4×4 discrete cosine transform (DCT 4×4).

Next, at step S4, high-frequency components of discrete cosine coefficients of the pixel block for the top field, obtained on 4×4 discrete cosine transform, are thinned out to give a pixel block made up of 2×2 discrete cosine coefficients. It is noted that discrete cosine coefficients in the perpendicular direction, among the totality of the coefficients of the pixel block for the top field, are shown as $z_1$, $z_3$, $z_5$ and $z_7$ in the drawing. Also, high-frequency components of discrete cosine coefficients of the pixel block for the bottom field, obtained on 4×4 discrete cosine transform, are thinned out to give a pixel block made up of 2×2 discrete cosine coefficients. It is noted that discrete cosine coefficients in the perpendicular direction, among the totality of the coefficients of the pixel block for the bottom field, are shown as $z_2$, $z_4$, $z_6$ and $z_8$ in the drawing.

Then, at step Script interpreter execution unit 5, 2×2 inverse discrete cosine transform (IDCT 2×2) is performed on the pixel blocks, from which the discrete cosine coefficients of the high-frequency components have been thinned out. 2×2 decoded pixel data x' can be obtained on 2×2 inverse discrete cosine transform. The pixel data in the perpendicular direction, among the totality of pixel data of the pixel block of the top field are shown as $x'_1$ and $x'_3$, while the pixel data in the perpendicular direction, among the totality of pixel data of the pixel block of the bottom field, are shown as $x'_2$ and $x'_4$.

Then, at step S6, pixel data of the pixel block for the top field and pixel data of the pixel block for the bottom field are alternately synthesized along the perpendicular direction on the line basis to generate a DCT block. The processing of alternately synthesizing pixels of the two pixel blocks for the top and bottom fields along the perpendicular direction is referred to below as frame synthesis.

By performing the one-block processing, shown in the above steps S1 to S6, the decimating inverse discrete cosine transform unit for frame mode 15 is able to generate a 4×4 DCT block, constituted by pixels of the same phase as the phase of the pixels of the standard resolution picture generated by the decimating inverse discrete cosine transform unit 14, as shown in FIG. 12.

It is possible with the picture decoding device 10 to perform 4×4 decimating IDCT processing by the decimating IDCT device 14 for field mode, and processing of steps S1 to S6 by the decimating IDCT device 15 for frame mode, with the aid of fast algorithm.

For example, the processing speed can be enhanced by employing the Wang algorithm (Zhong DE Wang., "Fast Algorithms for the Discrete W Transform and for the Discrete Fourier Transform", IEEE Tr. ASSP-32, No.4, predicted upper-order picture.803 to 816, August 1984).

The matrix used by the decimating inverse discrete cosine transform unit 14 for processing may be resolved by the Wang algorithm as indicated by the following equation (1):

$$[C_4^{II}]^{-1} = [C_4^{III}] = \frac{1}{\sqrt{2}} \begin{bmatrix} 1 & 0 & 0 & 1 \\ 0 & 1 & 1 & 0 \\ 0 & 1 & -1 & 0 \\ 1 & 0 & 0 & -1 \end{bmatrix} \begin{bmatrix} C_2^{III} & \\ & \overline{C}_2^{III} \end{bmatrix} \begin{bmatrix} 1 & 0 & 0 & 1 \\ 0 & 0 & 1 & 0 \\ 0 & 0 & 0 & 1 \\ 0 & 1 & 0 & 0 \end{bmatrix} \quad (1)$$

$$[C_2^{III}] = [C_4^{II}]^T = \begin{bmatrix} \frac{1}{\sqrt{2}} & \frac{1}{\sqrt{2}} \\ \frac{1}{\sqrt{2}} & -\frac{1}{\sqrt{2}} \end{bmatrix} = \frac{1}{\sqrt{2}} \begin{bmatrix} 1 & 1 \\ 1 & -1 \end{bmatrix} \qquad C_r = \cos(r\pi)$$

$$[\overline{C}_2^{IV}] = \begin{bmatrix} -\frac{C_1}{8} & \frac{C_3}{8} \\ \frac{C_3}{8} & \frac{C_1}{8} \end{bmatrix} = \begin{bmatrix} 1 & 0 & -1 \\ 0 & 1 & 1 \end{bmatrix} \begin{bmatrix} -\frac{C_1+C_3}{8} & 0 & 0 \\ 0 & \frac{C_1+C_3}{8} & 0 \\ 0 & 0 & \frac{C_3}{8} \end{bmatrix} \begin{bmatrix} 1 & 0 \\ 0 & 1 \\ 1 & -1 \end{bmatrix}.$$

Figure 14:
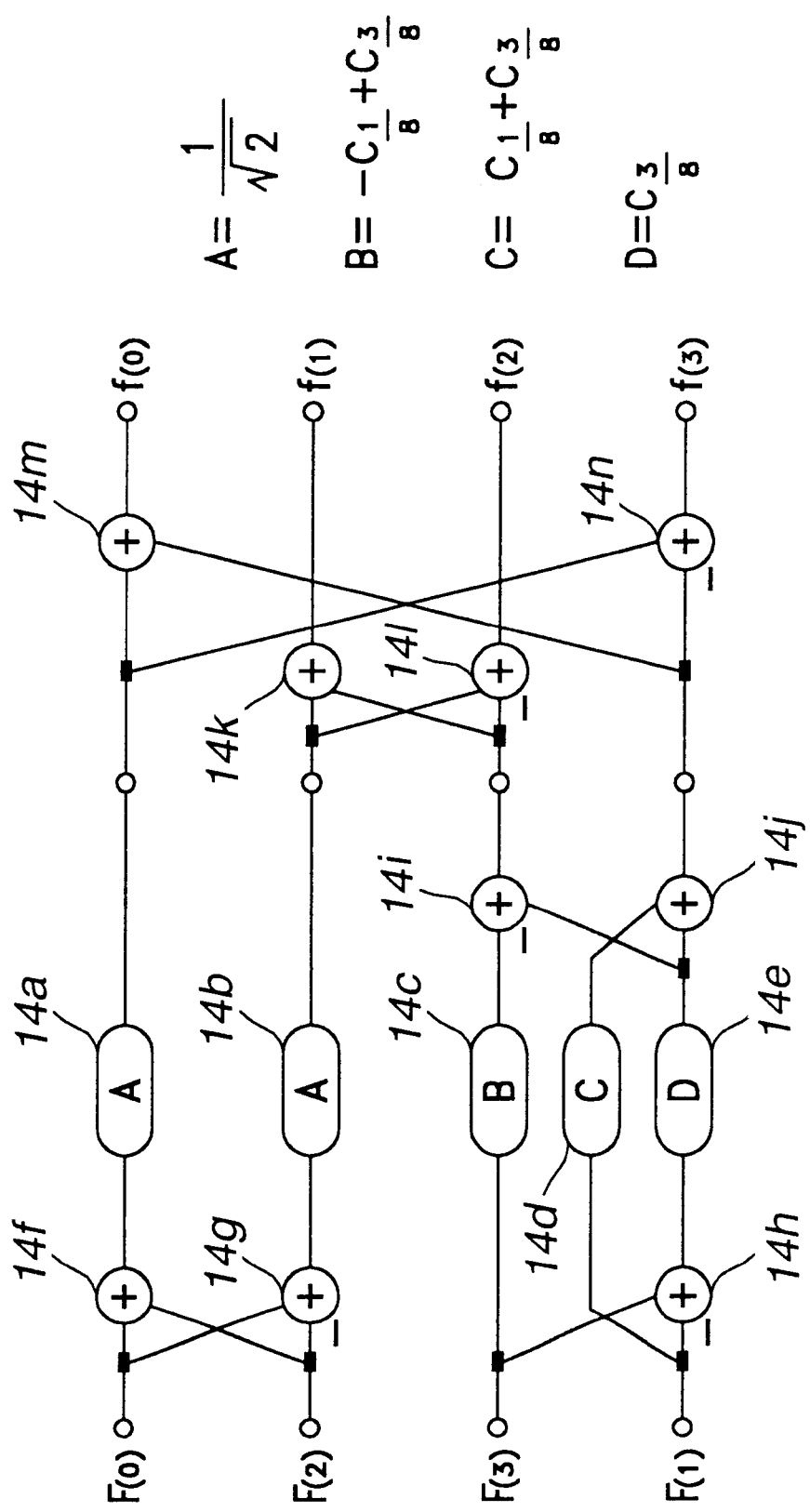
FIG. 14 illustrates the processing flow in case the Wang's algorithm is applied to the processing of the decimating IDCT apparatus for field mode of the first embodiment of the picture decoding apparatus.

FIG. 14 shows the processing flow in the case of applying the Wang algorithm to the processing by the decimating inverse discrete cosine transform unit 14. As may be seen form this processing flow, a high processing speed can be realized using first to fifth multipliers 14*a* to 14*e* and first to ninth adders 14*f* to 14*n*.

The matrix [FS'] used by the decimating inverse discrete cosine transform unit 14 for processing may be resolved by the Wang algorithm as indicated by the following equation (2):

$$[FS'] = \frac{1}{\sqrt{2}} \begin{bmatrix} 1 & 0 & 0 & 0 \\ 0 & 0 & 0 & 1 \\ 0 & 1 & 0 & 0 \\ 0 & 0 & 1 & 0 \end{bmatrix} \begin{bmatrix} 1 & 0 & 1 & 0 \\ 0 & 1 & 0 & 1 \\ 1 & 0 & -1 & 0 \\ 0 & 1 & 0 & -1 \end{bmatrix} \begin{bmatrix} [M_1] & \\ & [M_2] \end{bmatrix} \begin{bmatrix} 1 & 0 & 0 & 0 & 0 & 0 & 0 & 0 \\ 0 & 0 & 1 & 0 & 0 & 0 & 0 & 0 \\ 0 & 0 & 0 & 0 & 1 & 0 & 0 & 0 \\ 0 & 0 & 0 & 0 & 0 & 0 & 1 & 0 \\ 0 & 0 & 0 & 1 & 0 & 0 & 0 & 0 \\ 0 & 0 & 0 & 0 & 0 & 1 & 0 & 0 \\ 0 & 1 & 0 & 0 & 0 & 0 & 0 & 0 \\ 0 & 0 & 0 & 0 & 0 & 0 & 0 & 1 \end{bmatrix} \quad (2)$$

$$[M_1] = \begin{bmatrix} 1 & 1 \\ -1 & -1 \end{bmatrix} \begin{bmatrix} 1 & 0 & 0 & 0 \\ 0 & 1 & 1 & 1 \end{bmatrix} \begin{bmatrix} A & 0 & 0 & 0 \\ 0 & D & 0 & 0 \\ 0 & 0 & F & 0 \\ 0 & 0 & 0 & H \end{bmatrix}$$

$$[M_2] = \begin{bmatrix} 1 & 1 & 0 \\ 1 & 0 & 1 \end{bmatrix} \begin{bmatrix} -1 & 1 & 0 & 0 & 0 & 0 \\ 0 & 0 & 1 & 0 & 1 & 0 \\ 0 & 0 & 0 & 1 & 0 & 1 \end{bmatrix} \begin{bmatrix} E & 0 & 0 & 0 \\ 0 & G & 0 & 0 \\ 0 & 0 & B & 0 \\ 0 & 0 & C & 0 \\ 0 & 0 & 0 & I \\ 0 & 0 & 0 & J \end{bmatrix}.$$

In the equation (2), A to J are defined as follows:

$$A = \frac{1}{\sqrt{2}}$$

$$F = \frac{\cos\frac{\pi}{8} - \cos\frac{3\pi}{8}}{4}$$

$$D = \frac{1}{4}$$

$$H = \frac{1}{4} + \frac{1}{2\sqrt{2}}$$

$$B = \frac{\cos\frac{\pi}{16} + \cos\frac{3\pi}{16} + 3\cos\frac{5\pi}{16} - \cos\frac{7\pi}{16}}{4}$$

$$C = \frac{\cos\frac{\pi}{16} - 3\cos\frac{3\pi}{16} - \cos\frac{5\pi}{16} - \cos\frac{7\pi}{16}}{4}$$

$$E = \frac{\cos\frac{\pi}{16} - \cos\frac{3\pi}{16} - \cos\frac{5\pi}{16} - \cos\frac{7\pi}{16}}{4}$$

$$G = \frac{\cos\frac{\pi}{16} - \cos\frac{3\pi}{16} + \cos\frac{5\pi}{16} + \cos\frac{7\pi}{16}}{4}$$

$$I = \frac{\cos\frac{\pi}{16} - \cos\frac{3\pi}{16} + 3\cos\frac{5\pi}{16} + \cos\frac{7\pi}{16}}{4}$$

$$J = \frac{\cos\frac{\pi}{16} + 3\cos\frac{3\pi}{16} - \cos\frac{5\pi}{16} + \cos\frac{7\pi}{16}}{4}$$

Figure 15:
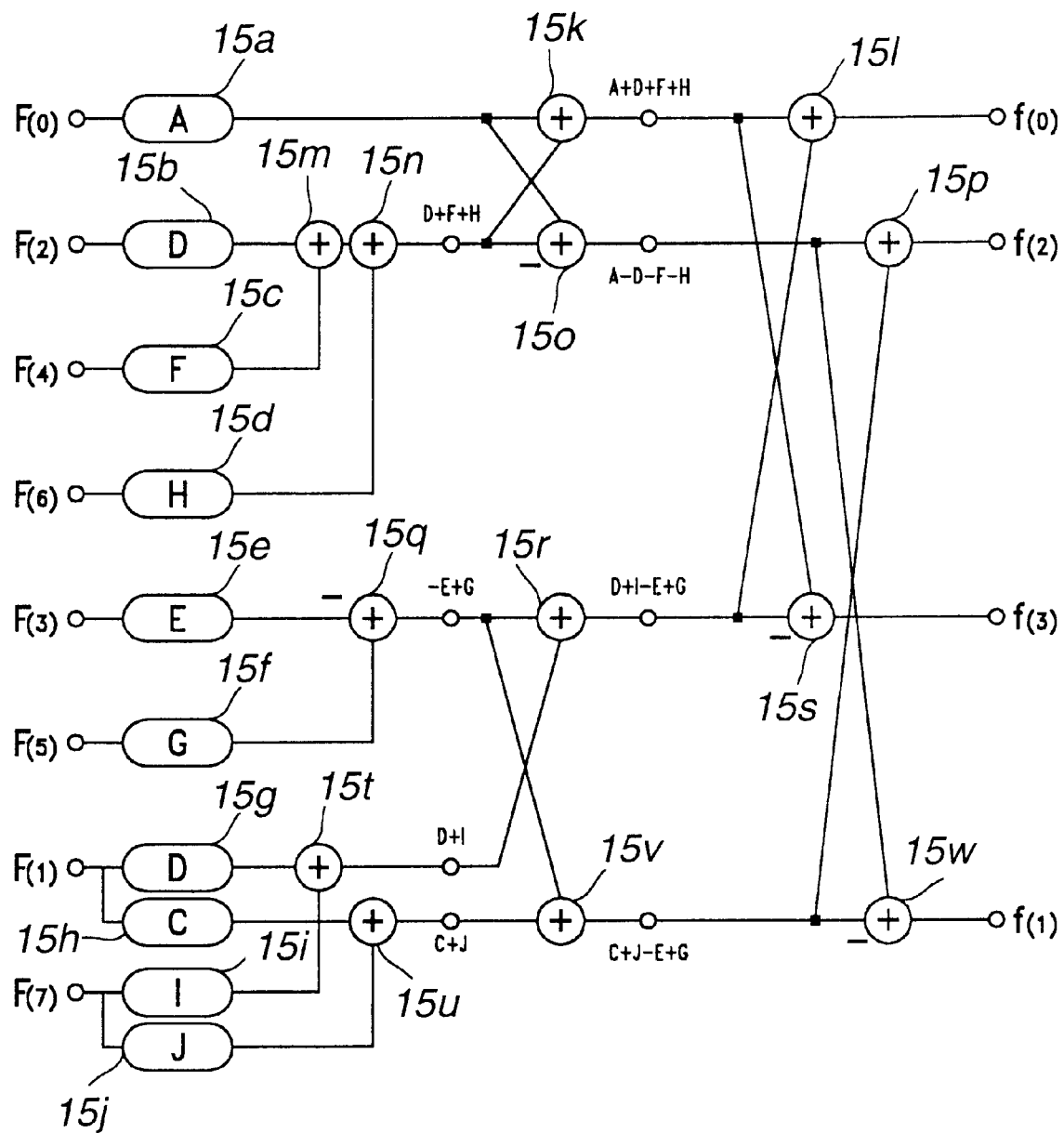
FIG. 15 illustrates the processing flow in case the Wang's algorithm is applied to the processing of the decimating IDCT apparatus for frame mode of the first embodiment of the picture decoding apparatus.

The processing flow in the case of applying the Wang algorithm to the processing by the decimating inverse discrete cosine transform unit for frame mode 15 is shown in FIG. 15. As may be seen from this processing flow, the processing speed can be enhanced by employing first to tenth multipliers 15*a* to 15*j* and first to thirteenth adders 15*k* to 15*w*.

In the picture decoding device 10 of the first embodiment of the present invention, each of the top and bottom fields is processed with 4×4 decimating IDCT to decode a picture of standard resolution, for the field DCT mode. On the other hand, for the frame DCT mode, a picture of standard resolution is decoded by frame separation followed by decimating IDCT. Since the processing of the present picture decoding device 10 for the field DCT mode differs from that for the frame DCT mode, there is no risk of impairing the properties inherent in the picture obtained on interlaced scanning. Moreover, the picture obtained for the field DCT mode can be equated in phase to that obtained for the frame DCT mode, thus not deteriorating the quality of the output picture.

The processing contents of the variable length decoding device 12 are further explained in detail.

Figure 16:
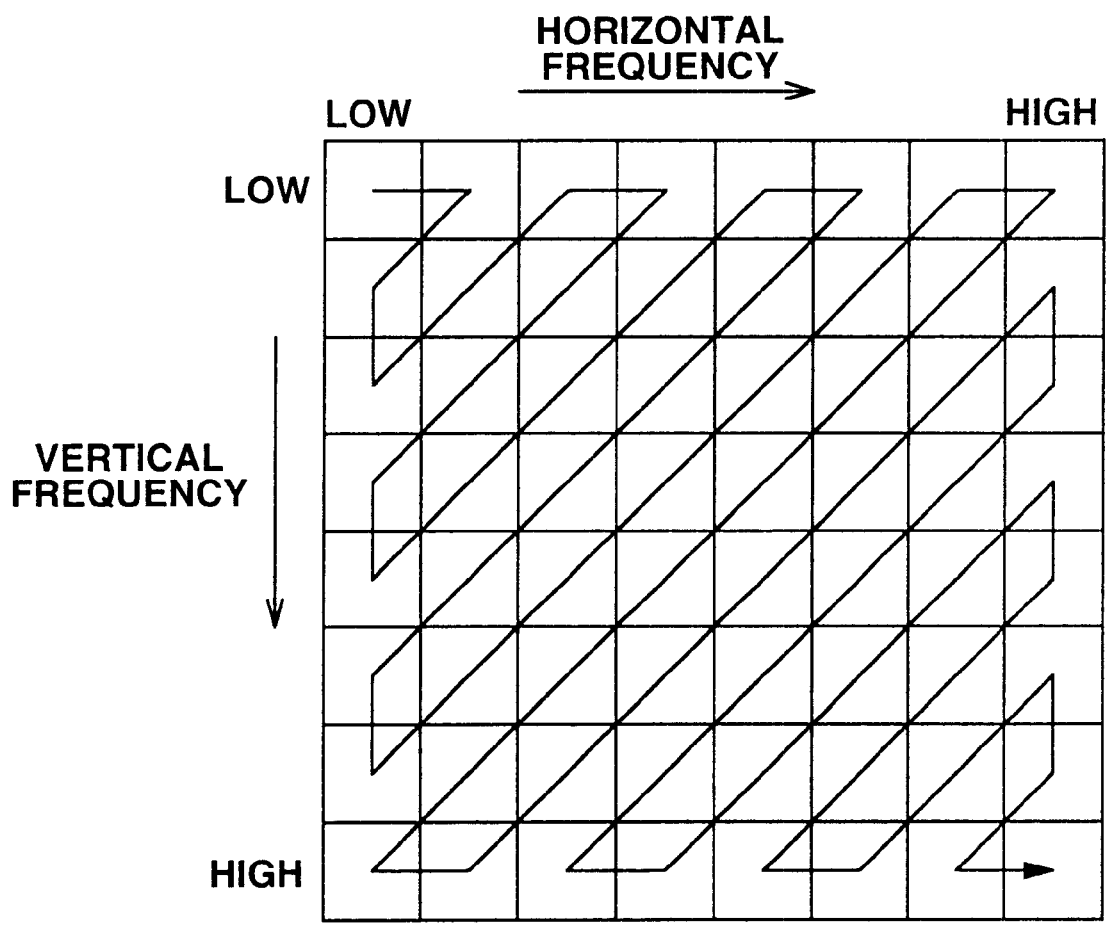
FIG. 16 illustrates the zigzag scan.
Figure 17:
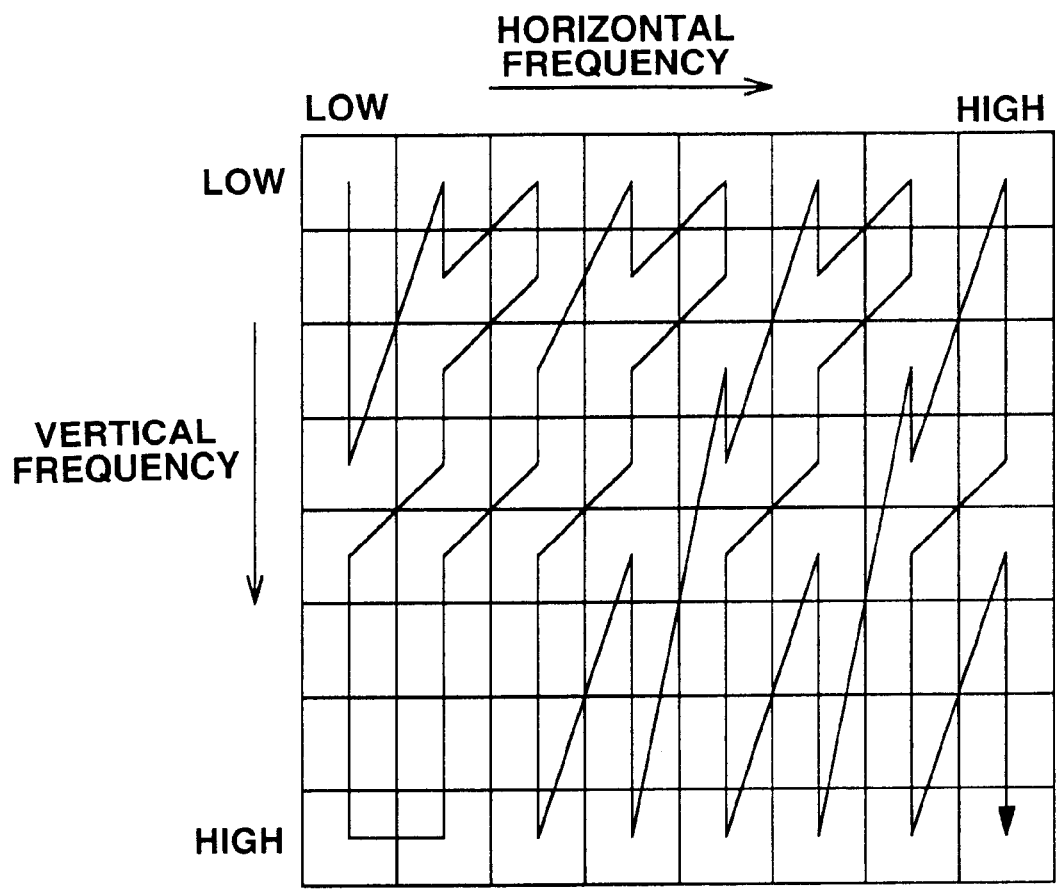
FIG. 17 illustrates the alternate scan.

In MPEG 2, a DCT block is scanned and converted into one-dimensional information, which is variable length encoded, in order to store the DCT coefficients, two-dimensionally arrayed in the DCT block, in a bitstream. For example, MPEG2 provides zigzag scan for scanning 8×8 DCT coefficients, as shown in FIG. 16, and alternating scan, for scanning the 8×8 DCT coefficients, as shown in FIG. 17. The variable length decoding device 12 is responsive to this scanning system for the DCT blocks to back-scan the coefficients in the DCT block to decode the variable length codes.

Meanwhile, the decimating DCT device for field mode 14 uses only low-frequency side 4×4 coefficients of the 8×8 DCT coefficients, in effecting IDCT, as discussed above. That is, if the input DCT block has been DCTed in the field DCT mode, only 4×4 DCT coefficients are used. On the other hand, in the decimating DCT device for frame mode 15 of the picture decoding device 10, only low frequency side 4×8 coefficients of the 8×8 DCT coefficients are used, in performing the IDCT, similarly as discussed above. That is, if the input DCT block has been DCTed in the frame DCT mode, only 4×8 DCT coefficients are used.

For this reason, if the input DCT block is DCTed in the field DCT mode, the variable length decoding device 12 executes back-scan only of the 4×4 DCT coefficients to effect variable length decoding up to the highest coefficient of the 4×4 DCT coefficients, while not variable length decoding ensuing higher frequency components. On the other hand, if the input DCT block has been DCTed in the frame DCT mode, the variable length decoding device 12 back-scans only 4×8 DCT coefficients to effect variable length decoding up to the highest frequency component coefficient of the 4×8 DCT coefficients, while not variable length decoding ensuing higher frequency components.

Specifically, if, in the variable length decoding device 12, the input DCT block is DCTed by the field DCT mode, and the scanning system is the zigzag scan, the DCT coefficients having 0th to 24th scanning numbers, are back-scanned and variable length decoded, while the 25th and the ensuing DCT coefficients are not processed until detection of an EOB (end-of-block) signal. Meanwhile, the scanning numbers of the respective coefficients in the DCT block are shown in FIG. 18, as in FIGS. 19 and 25. Similarly, if, in the variable length decoding device 12, the input DCT block is DCTed by the frame DCT mode, and the scanning system is the alternating scan, the DCT coefficients having 0th to 25th scanning numbers, are back-scanned and variable length decoded, while the 26th and the ensuing DCT coefficients are not processed until detection of the EOB signal, as shown in FIG. 19. Also, if, in the variable length decoding device 12, the input DCT block is DCTed by the frame DCT mode, and the scanning system is the zigzag scan, the DCT coefficients having the scanning numbers from 0 to 49 are back-scanned and variable length decoded, whilst the 50th and the ensuing DCT coefficients are not processed until detection of the EOB signal, as shown in FIG. 20. On the other hand, if the input DCT block is DCTed by the frame DCT mode, and the scanning system is the alternate scan, the DCT coefficients having the scanning numbers from 0 to 33 are back-scanned and variable length decoded, whilst the 34th and the ensuing DCT coefficients are not processed until detection of the EOB signal, as shown in FIG. 21.

The variable length decoding device 12 curtails the processing of the redundant high frequency components not used in the subsequent processing, as described above, to curtail the processing volume without deteriorating the picture quality.

The variable length decoding device 12 is able to curtail the processing volume, in accordance with the processing capacity of the picture decoding device 10, as now explained.

If, for example, the input DCT block is DCTed in the field DCT mode, and the scanning system is the zigzag scanning system, the variable length decoding device 12 does not perform the back-scan shown in FIG. 18 and, in its stead, back-scans the DCT coefficients having the scanning numbers of 0 to 13, and variable length decodes these coefficients, while not processing the 14th and ensuing DCT coefficients, until detection of the end-of-block (EOB) signal, as shown in FIG. 22. Of the DCT coefficients which were not back-scanned and which are included in the 4×4 coefficients outputted by the variable length decoding device 12, in this case, 17th, 18th and 24th DCT coefficients, are replaced by 0s.

By this processing, the number of scans (14) in the back scanning processing shown in FIG. 22 are much smaller than the number of scans (25) in the back-scan shown in FIG. 18. Notwithstanding, the number of the DCT coefficients of the 4×4 DCT coefficients which were not back-scanned is three (17th, 18th and 24th). That is, the processing volume is appreciably smaller than the number of the DCT coefficients of the 4×4 DCT coefficients that were not back-scanned. Thus, with the variable length decoding device 12, the processing volume can be reduced significantly even though the deterioration in the picture quality is suppressed to a minimum.

Similarly, if the input DCT block has been DCTed with the field DCT mode, and the scanning system is alternate scan, the variable length decoding device 12 back-scans DCT coefficients having the scanning numbers of from 0 to 20, as shown in FIG. 23, in place of doing the back-scan shown in FIG. 19, by way of performing the variable length decoding. As for the 21st and ensuing DCT coefficients, the variable length decoding device 12 performs no processing until detection of the EOB signal. The DCT coefficients that were not back-scanned and that are contained in the 4×4 coefficients outputted by the variable length decoding device 12 (herein the 21st, 24th and 25th DCT coefficients), are replaced by 0 values.

If the input DCT block is DCTed with the field DCT mode, with the scanning system being zigzag scan, the variable length decoding device 12 performs back-scan for DCT coefficients having the scanning numbers of from 0 to 24, as shown in FIG. 24, in place of the back-scan shown in FIG. 20, by way of performing the variable length decoding. As for the 25th and ensuing DCT coefficients, the variable length decoding device 12 performs no processing until detection of the EOB signal. The DCT coefficients that were not back-scanned and that are contained in the 4×8 coefficients outputted by the variable length decoding device 12 (herein the 21st, 32nd, 33rd, 34th, 35th, 36th, 37th, 38th, 47th, 48th and 49th DCT coefficients), are replaced by 0 values.

If the input DCT block is DCTed with the frame DCT mode, with the scanning system being alternate scanning, the variable length decoding device 12 performs back-scanning for DCT coefficients having the scanning numbers of from 0 to 25, as shown in FIG. 25, in place of the back-scanning shown in FIG. 21, by way of performing the variable length decoding. As for the 30th and ensuing DCT coefficients, the variable length decoding device 12 performs no processing until detection of the EOB signal. The DCT coefficients that were not back-scanned and that are contained in the 4×8 coefficients outputted by the variable length decoding device 12 (herein the 30th, 31st, 32nd and 33rd DCT coefficients), are replaced by 0 values.

Up to which DCT coefficient in terms of the scanning number can be determined depending on the processing capability of the picture decoding device 10 and the quantity of picture quality deterioration, so that the above embodiment is merely given as illustration.

It is also possible for the variable length decoding device 12 to detect whether the DCT block belongs to the intra-picture, an inter-picture, an intra-macroblock or to an inter-macroblock, and to perform control as it changes the scanning number of the DCT coefficient up to which back-scanning is to be made. The bitstream information is analyzed by a bitstream analyzer 11 and subsequently furnished.

If the DCT block to be decoded belongs to an intra-picture or to an intra-macroblock, the variable length decoding device 12 variable-length-decodes the totality of the DCT coefficients contained in the 4×4 coefficients, as shown in FIG. 18., so that up to the high frequency components of the DCT block can be decoded. If the DCT block to be decoded belongs to the inter-picture or to the inter-macro-block, the variable length decoding device 12 does not decode the totality of the frequency components of the DCT block and variably decodes all but certain high frequency components of the DCT coefficients contained in the 4×4 coefficients as shown in FIG. 22.

Thus, by changing up to which DCT coefficient in terms of the scanning number can be back-scanned by the variable length decoding device 12, the picture decoding device 10 is able to decrease the processing volume as it suppresses picture quality deterioration to a minimum extent.

Meanwhile, the switching parameters for decreasing the processing volume may be changed over based on, for example, the information as to whether the data to be processed belongs to the luminance signals or the chroma signals, or the information as to whether the data to be processed belongs to the I-picture, P-picture or the B-picture.

The processing of the decimating DCT device for frame mode 15 is explained further in detail.

The decimating DCT device for field mode 14 performs the decimating IDCT of 4×4 coefficients, whilst the decimating DCT device for frame mode 15 performs the decimating IDCT of 4×8 coefficients. Thus, if many DCT blocks of the frame DCT mode are contained in the input bitstream, the processing volume imposed on the picture decoding device 10 is increased. Therefore, it is possible with the present picture decoding device 10 to cause the decimating DCT device for frame mode 15 to perform the processing in the following manner to curtail the processing volume.

Figure 26:
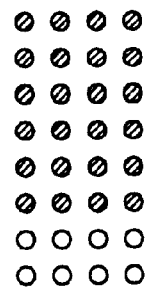
FIG. 26 shows an example of substituting 0s for 4×2 coefficients of high frequency components in the vertical direction among 4×8 DCT coefficients with which a decimating IDCT apparatus for frame mode performs inverse IDCT.

The decimating DCT device for frame mode 15 performs the processing as from step S1 to step S6 in FIG. 13, after the 4×2 coefficients of the high frequency components in the vertical direction, for example, the coefficients indicated at white circle positions in FIG. 26, among the 4×8 DCT coefficients, are replaced by 0s. The processing volume can be curtailed by substituting 0s for part of the coefficients being processed. Since the processing steps are not changed by substituting 0s for certain coefficients, the output pixel phase remains unchanged, such that such substitution is not likely to give rise to an error due to difference in phase.

Figure 4:
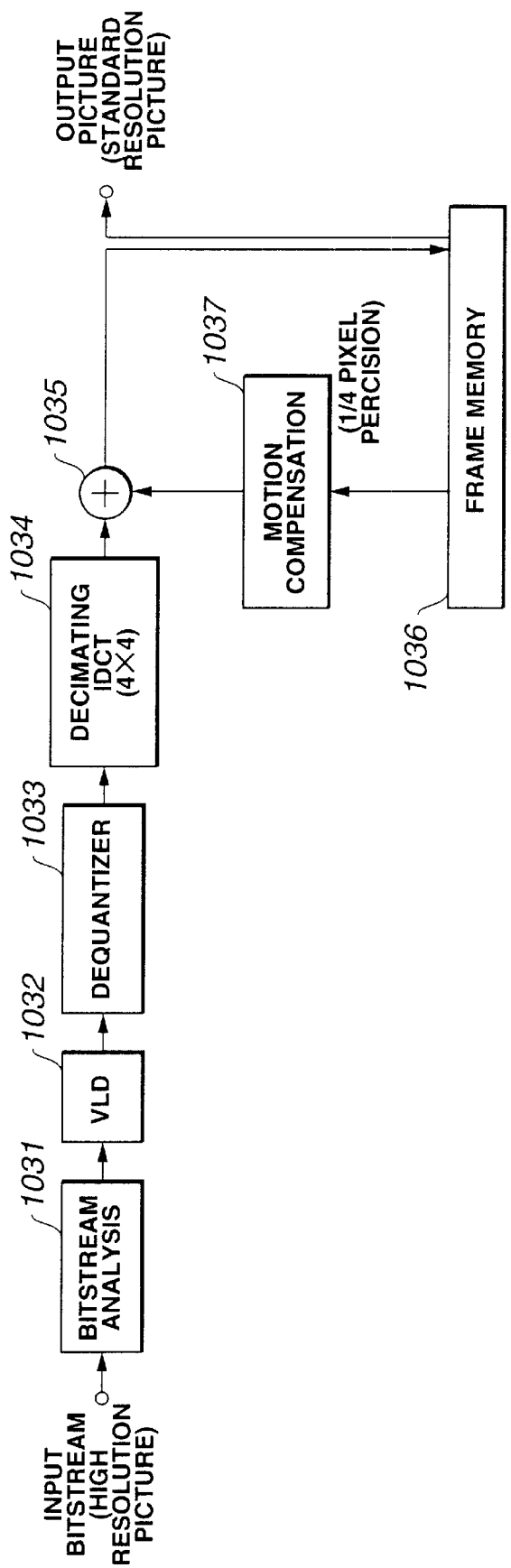
FIG. 4 is a block diagram of a conventional picture decoding apparatus.
Figure 27:
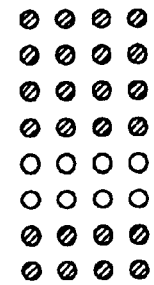
FIG. 27 shows an example of substituting 0s for 4×2 coefficients of mid frequency components in the vertical direction among 4×8 DCT coefficients with which a decimating IDCT apparatus for frame mode performs decimating IDCT.
Figure 28:
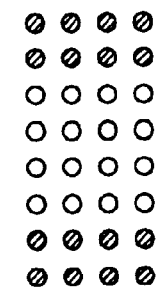
FIG. 28 shows an example of substituting 0s for 4×4 coefficients of mid frequency components in the vertical direction among 4×8 DCT coefficients with which a decimating IDCT apparatus for frame mode performs inverse IDCT.

In the decimating DCT device for frame mode 15, 4×2 coefficients of the mid frequency components in the vertical direction shown in FIG. 27, such as coefficients at the positions indicated by white circles in FIG. 27 or 4×4 coefficients of the mid frequency components in the vertical direction shown in FIG. 28, such as coefficients at the positions indicated by white circles in FIG. 28, may be replaced by 0s. The reason is that, if the input upper layer picture is the picture obtained on interlaced scanning, it may be an occurrence that the field-to-field difference information is contained in the high frequency components of the DCT coefficients. For example, if an object is panned in the horizontal direction, the field-to-field difference information is contained in the high frequency components. Therefore, if the picture is the picture obtained on interlaced scanning, picture quality deterioration may be smaller if 0s are substituted for the 4×2 coefficients of the mid frequency components in the vertical direction, as shown in FIGS. 27 and 28, than if 0s are substituted for the high frequency components in the vertical direction, as shown in FIG. 26.

In the decimating DCT device for frame mode 15, it is possible to detect by the bitstream analysis unit 11 whether the DCT block being processed belongs to the I-picture, P-picture or to the B-picture, and to switch between performing decimating IDCT of all of the 4×8 coefficients and performing decimating IDCT after substitution of 0s for certain coefficients, based on the detected information.

For example, the decimating DCT device for frame mode 15 performs decimating IDCT on all coefficients in the 4×8 coefficients for the I- and P-pictures, because deterioration of picture quality of the I- or P-picture is not propagated to other pictures. Also, the decimating DCT device for frame mode 15 performs decimating IDCT on all coefficients in the 4×8 coefficients, after substituting 0s for part of the coefficients of the B-picture, because deterioration of picture quality of the B-picture is not transmitted to other pictures. This diminished the processing volume. The parameters for switching for diminishing the processing volume may be switched based on the information as to whether the data being processed belongs to the luminance signals or to chroma signals, or on the information as to whether the data being processed belongs to an intra-macro-block or to an inter-macro-block.

Thus, with the picture decoding device 10, it is possible to suppress the picture quality deterioration to a minimum to curtail the processing volume by the decimating DCT device for frame mode 15 substituting 0s for part of the coefficients for IDCT.

Figure 29:
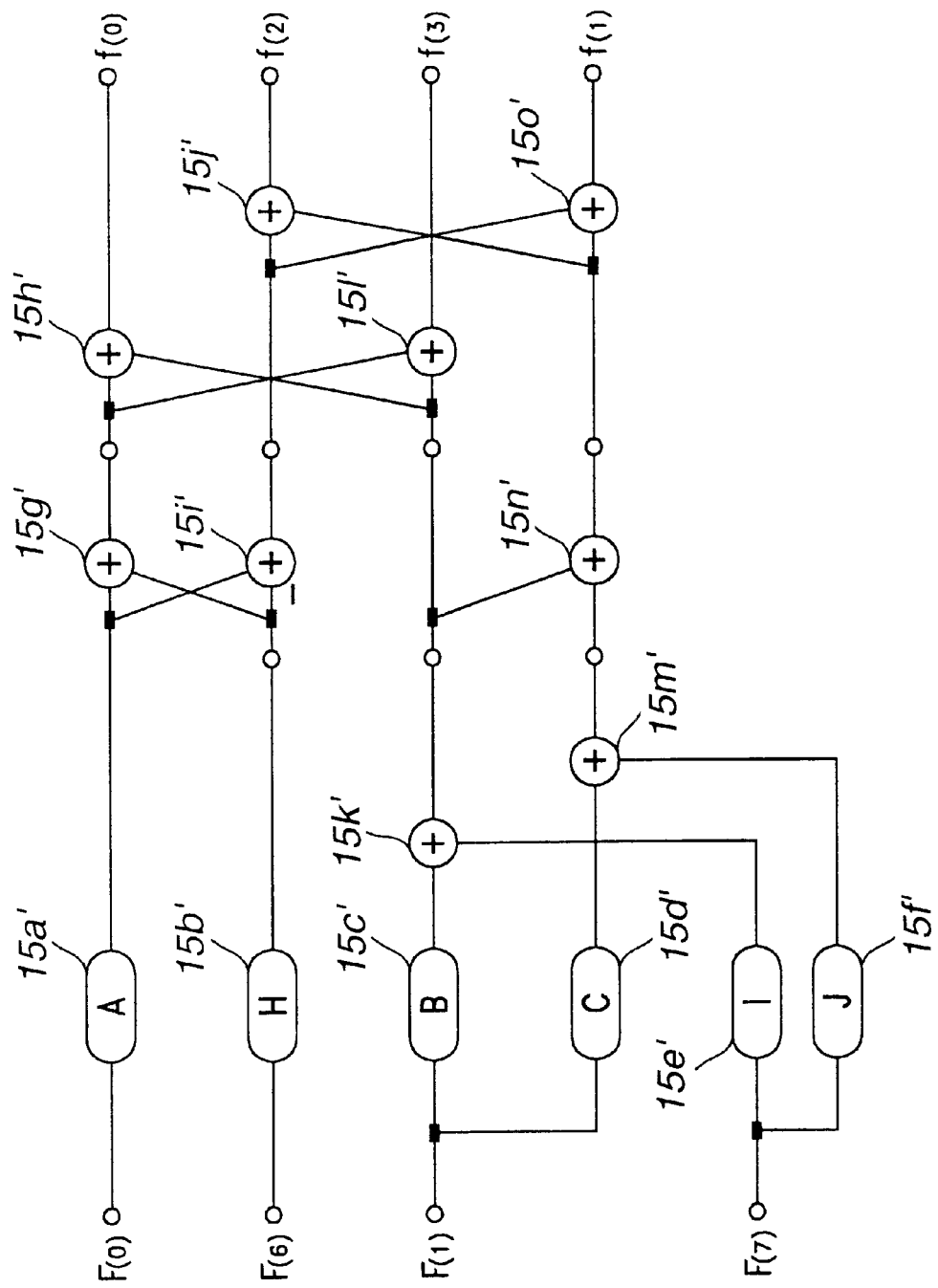
FIG. 29 shows processing flow in case the Wang's algorithm is applied to the processing of the decimating IDCT apparatus for field mode in case the decimating IDCT is performed with the coefficients shown in FIG. 16.

It is noted that, if a fast algorithm is used by the decimating DCT device for frame mode 15 for processing, the picture decoding device 10 can be simplified in circuit scale. For example, if the 4×4 coefficients of the mid frequency components in the vertical direction are replaced by 0s, as shown in FIG. 28, the processing flow of FIG. 15 can be simplified to a processing flow comprised of first to sixth multipliers 15′a to 15′f and first to ninth adders 15′a to 15′o, as shown in FIG. 29. The processing flow shown in FIG. 29 is appreciably similar to that of the fast algorithm of the decimating DCT device for field mode 14 shown in FIG. 14 and, hence a common circuit may be used, thus further reducing the circuit scale.

Also, with the present picture decoding device 10, the overall processing volume can be curtailed efficiently by combining the processing volume curtailing operation performed by the variable length decoding device 12 and that performed by the decimating DCT device for frame mode 15. For example, it is possible with the variable length decoding device 12 to back-scan the DCT coefficients in meeting with the coefficients being set to 0 by the decimating DCT device for frame mode 15 and to change the number of coefficients to be back-scanned in meeting with the coefficients being set to 0 by the decimating DCT device for frame mode 15 to realize efficient processing.

If the variable length decoding device 12 performs decimating IDCT when the decimating DCT device for frame mode 15 has set 0s for 2×2 coefficients of the high frequency components in the vertical direction, as shown in FIG. 26, it is possible for the variable length decoding device 12 to back-scan DCT coefficients having the scanning numbers of from 0 to 38 to perform variable length decoding, with the variable length decoding device 12 then not performing processing on the 39th and the ensuing DCT coefficients until detection of the EOB signal. It is also possible for the variable length decoding device 12 to back-scan the DCT coefficients with the scanning numbers of from 0 to 24, as shown in FIG. 31, to perform variable length decoding, with the 25th and ensuing DCT coefficients not being processed until detection of the EOB signal. Although FIGS. 30 and 31 show the case of zig-zag scan, it may also be applied to alternate scan.

Second Embodiment

A picture decoding device of a second embodiment of the present invention is hereinafter explained. In the following explanation of the picture decoding device of the present second embodiment, parts or components which are the same as those of the picture decoding device 10 of the first embodiment are depicted by the same reference numerals and are not explained specifically.

Figure 32:
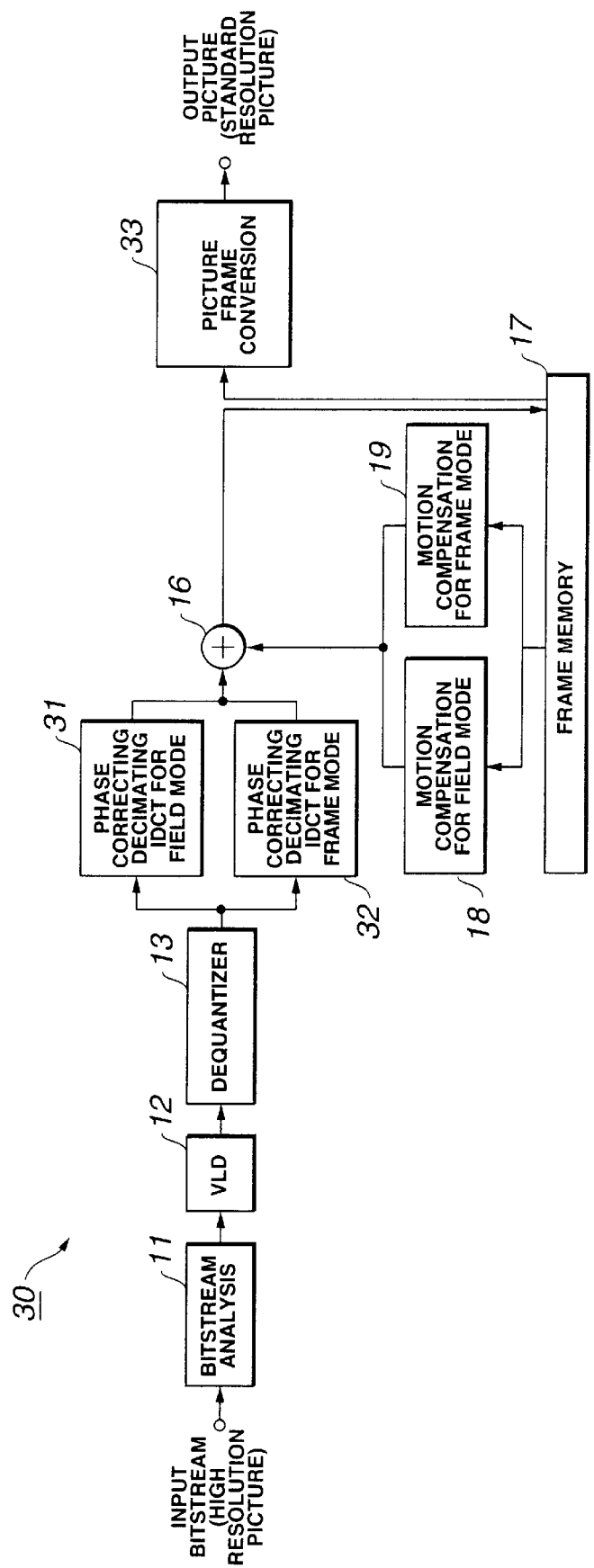
FIG. 32 is a block diagram of a picture decoding apparatus according to a second apparatus of the present invention.

Referring to FIG. 32, a picture decoding device 30 according to the second embodiment of the present invention is fed with a bitstream corresponding to a high resolution picture with the number of effective lines in the vertical direction of, for example, 1152, obtained on picture compression with MPEG2, and decodes this input bitstream as it reduces the resolution to one half to output a standard resolution picture with the number of effective lines in the vertical direction of, for example, 576.

This picture decoding device 30 includes a bitstream analysis unit 11 for analyzing a bitstream of a compressed high resolution picture, and a variable length decoder 12 for decoding the bitstream encoded with variable length encoding of allocating a code length corresponding to the data occurrence frequency. The picture decoding device 30 also includes a dequantizer 13 for multiplying respective coefficients of the DCT block with a quantization step, and a phase-correcting decimating inverse discrete cosine transform unit for field mode 31 for decimating inverse discrete cosine transforming the DCT block discrete cosine transformed by the field DCT mode to generate a standard resolution picture. The picture decoding device 30 also includes a phase-correcting decimating inverse discrete cosine transform unit for frame mode 32 for decimating inverse discrete cosine transforming the DCT block discrete cosine transformed by the frame DCT mode to generate a standard resolution picture, and an addition unit 16 for summing the decimating inverse discrete cosine transformed standard resolution picture to the motion-compensated reference picture. The picture decoding device 30 also includes a frame memory 17 for transiently storing the reference picture, and a motion compensation unit for field mode 18 for motion-compensating the reference picture stored by the frame memory 17 in meeting with the field motion prediction mode. The picture decoding device 30 also includes a motion compensation unit for frame mode 19 for motion-compensating the reference picture stored in the frame memory 17 in meeting with the frame motion prediction mode and a picture frame conversion unit 33 for outputting picture data of the standard resolution for converting the picture frame of a picture stored in the frame memory 17 for display on e.g., a monitor.

The variable length decoding device 12 back-scans the coefficients in the DCT block, in accordance with the scanning system of the input DCT block, to decode the variable length codes. The scanning system for the DCT block is classified into e.g., a zigzag scan and an alternate scan. This scanning system is analyzed by the bitstream analysis unit 11 of the previous stage.

The phase-correcting decimating inverse discrete cosine transform unit for field mode 31 is used in the event that a macro-block of an input bitstream is discrete cosine transformed with the field motion prediction mode. In the phase-correcting decimating inverse discrete cosine transform unit for field mode 31, inverse discrete cosine transform, in which has been corrected the dephasing of pixels in the vertical direction of the top and bottom fields, is applied to only 4×8 coefficients, among the totality of the 8×8 coefficients of the DCT block in the macro-block discrete cosine transformed with the field DCT mode. That is, the phase-correcting decimating inverse discrete cosine transform unit for field mode 31 effects inverse discrete cosine transform in the horizontal direction based on the four low-range point discrete cosine coefficients, while effecting inverse discrete cosine transform corrected for de-phasing in the vertical direction, based on the eight point discrete cosine coefficients. Specifically, the phase-correcting decimating inverse discrete cosine transform unit for field mode 31 corrects the phase in an amount corresponding to ¼ pixel for each pixel of the top field in the vertical direction, while correcting the phase in an amount corresponding to ¾ pixel for each pixel of the bottom field in the vertical direction. By performing the above-described decimating inverse discrete cosine transform, a standard resolution picture (lower layer) is generated in which the phases of the respective pixels of the top field in the vertical direction are ¼, 9/4, . . . , with the phases of the respective pixels of the bottom field in the vertical direction being 5/4, 13/4, . . .

Figures 10A, 10B:
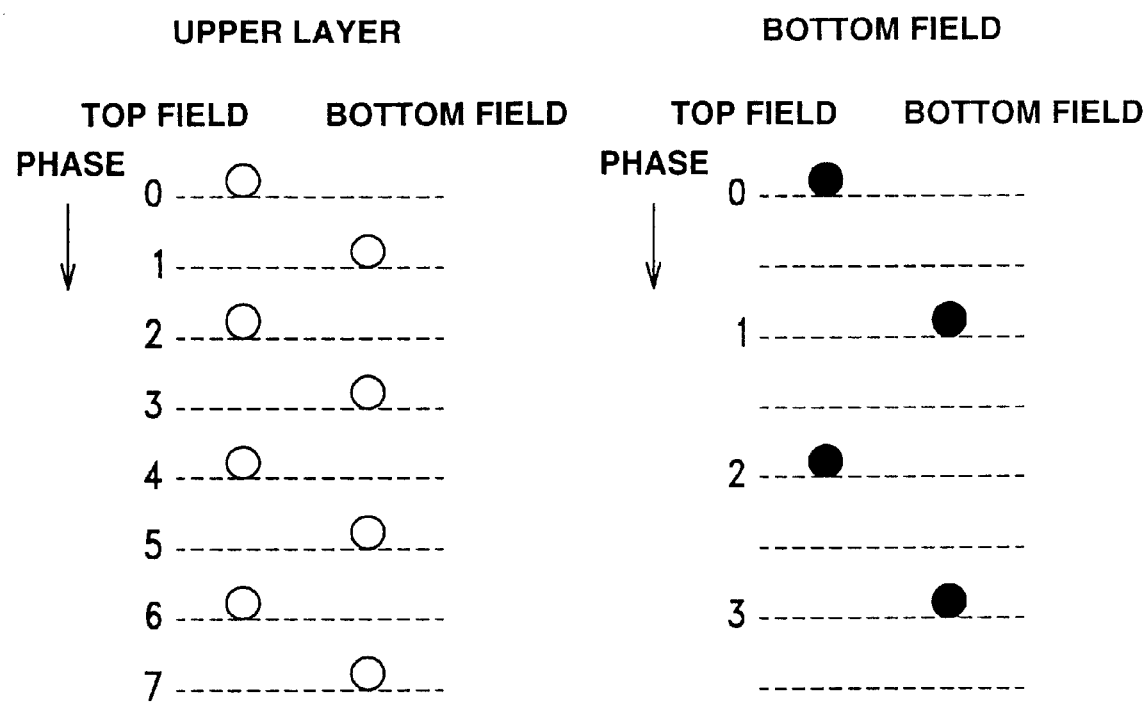
FIGS. 10A, 10B illustrate the phase of pixels obtained for the frame DCT mode of the conventional picture decoding apparatus.

The phase-correcting decimating inverse discrete cosine transform unit for frame mode 32 is used if a macro-block of an input bitstream has been discrete cosine transformed with the frame DCT mode. In the phase-correcting decimating inverse discrete cosine transform unit for frame mode 32, decimating inverse discrete cosine transform, in which the pixel dephasing along the vertical direction of the top field and the bottom field has been corrected, is applied to the DCT block with 8×8 coefficients in the macro-block discrete cosine transformed with the frame DCT mode. The phase-correcting decimating inverse discrete cosine transform unit for frame mode 32 generates a picture of the same phase as the phase of the pixels of the standard resolution picture generated by the phase-correcting decimating inverse discrete cosine transform unit for field mode 31. That is, the phase-correcting decimating inverse discrete cosine transform unit for frame mode 32 executes decimating inverse discrete cosine transform with one-block or two-block processing to generate a standard resolution picture (lower layer) in which the phases in the vertical direction of the respective pixels of the top field are ¼, 9/4, . . . , with the phases in the vertical direction of the respective pixels of the bottom field being 5/4, 13/4, . . . , as shown in FIG. 10.

The motion compensation unit for field mode 18 is used if the motion prediction mode of the macro-block is the field motion prediction mode. The motion compensation unit for field mode 18 applies pixel interpolation employing orthogonal transform to the reference picture of the standard resolution picture stored in the frame memory 17 to perform motion compensation for the field motion prediction mode. The reference picture, motion-compensated by the motion compensation unit for field mode 18, is sent to the addition unit 16, where it is synthesized to an inter-picture.

The motion compensation unit for frame mode 19 is used if the motion prediction mode of the macro-block is the frame motion prediction mode. The motion compensation unit for frame mode 19 interpolates the reference picture of the standard resolution picture, stored in the frame memory 17, at a ¼ pixel precision, to effect motion compensation corresponding to the frame motion prediction mode. The reference picture, motion-compensated by the motion compensation unit for frame mode 19, is sent to the addition unit 16, where it is synthesized to an inter-picture.

The picture frame conversion unit 33 is fed with a reference picture of the standard resolution stored in the frame memory 17 and converts the picture frame of this reference picture by post-filtering for conformity to the a standard for a standard resolution television. That is, the picture frame conversion unit 33 converts the picture frame of the high resolution television standard to the picture frame of the standard resolution television reduced in size to ¼. Meanwhile, with the present picture frame conversion unit 33, since the picture stored in the frame memory 17 is not subjected to dephasing between the top and bottom fields, it is unnecessary to effect the correction for pixel dephasing in contradistinction from the picture frame converting dephasing correction unit 20 of the above-described first embodiment.

With the picture decoding device 30 of the second embodiment, constructed as described above, the bitstream of a high resolution picture, compressed in accordance with MPEG2, can be decoded and simultaneously reduced in resolution to ½ in order to output a standard resolution picture.

The processing contents of the phase-correcting decimating inverse discrete cosine transform unit for field mode 31 will be explained in further detail.

Figure 34:
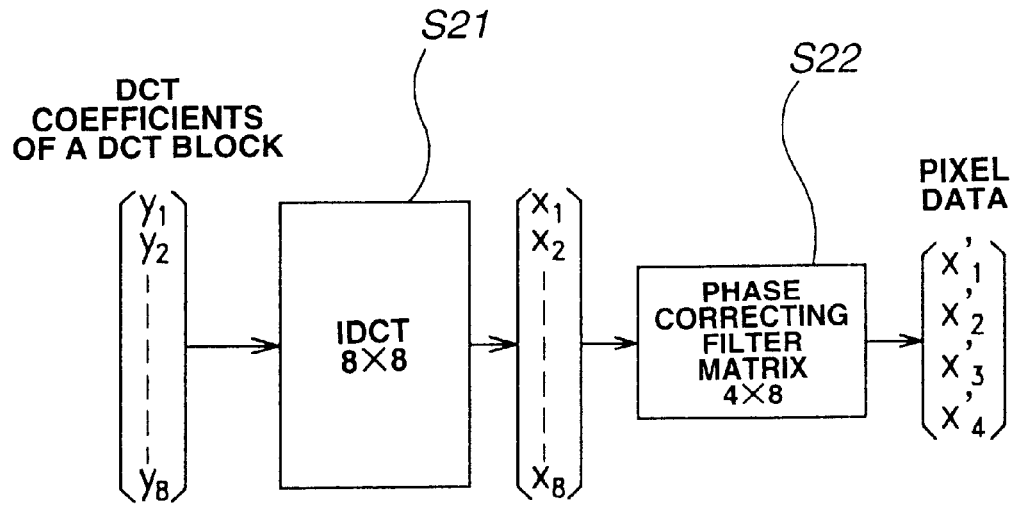
FIG. 34 illustrates the processing contents of the phase-correcting decimating IDCT apparatus for field mode of the second embodiment of the picture decoding apparatus.

The phase-correcting decimating inverse discrete cosine transform unit for field mode 31 is fed with a bitstream, compression-coded from a high resolution picture, in terms of a DCT block as a unit, as shown in FIG. 34.

First, at step S21, 8×8 inverse discrete cosine transform (IDCT8×8) is applied to the discrete cosine coefficients y of the sole DCT block. It is noted that the coefficients in the vertical direction, among the totality of the discrete cosine coefficients in the DCT block, are denoted as $y_1$ to $y_8$ in the drawing. By the inverse discrete cosine transform, 8×8 decoded pixel data x are obtained. It is noted that pixel data along the vertical direction, among the totality of pixel data of the DCT block, are indicated as $x_1$ to $x_8$ in the drawing.

Then, at step S22, these 8×8 pixel data are processed with transform closed in the DCT block, by a 4×8 phase-correcting filter matrix, in order to produce phase-corrected pixel data x'. It is noted that the pixel data along the vertical direction, among the totality of pixel data, are denoted as $x'_1$, $x'_2$, $x'_3$, $x'_4$ in the drawing.

By performing the processing of steps S21 and S22, the phase-correcting decimating inverse discrete cosine transform unit for field mode 31 can generate a picture not subjected to dephasing between the top and bottom fields.

Figure 35:
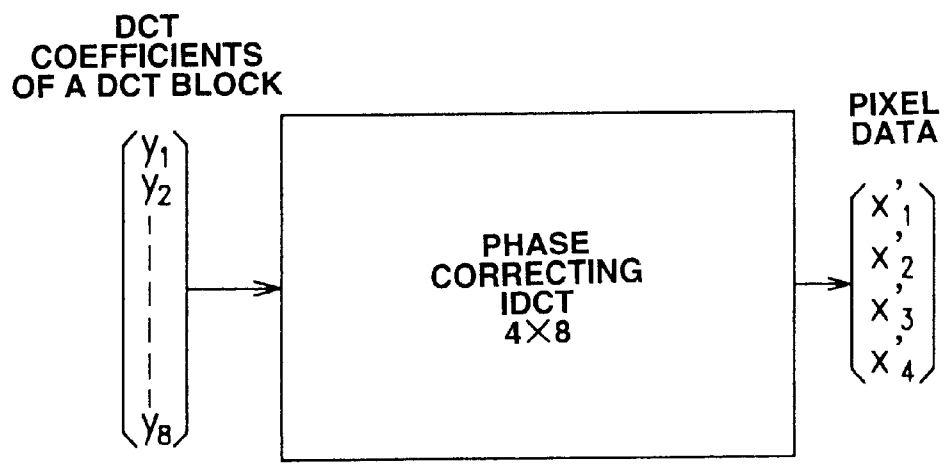
FIG. 35 illustrates the processing contents of the phase-correcting decimating IDCT apparatus for field mode in case the processing is performed by a sole matrix.

It is also possible with the phase-correcting decimating inverse discrete cosine transform unit for field mode 31 to perform the above processing using a sole matrix (4×8 phase-correcting IDCT matrix), as shown in FIG. 35.

Figure 36:
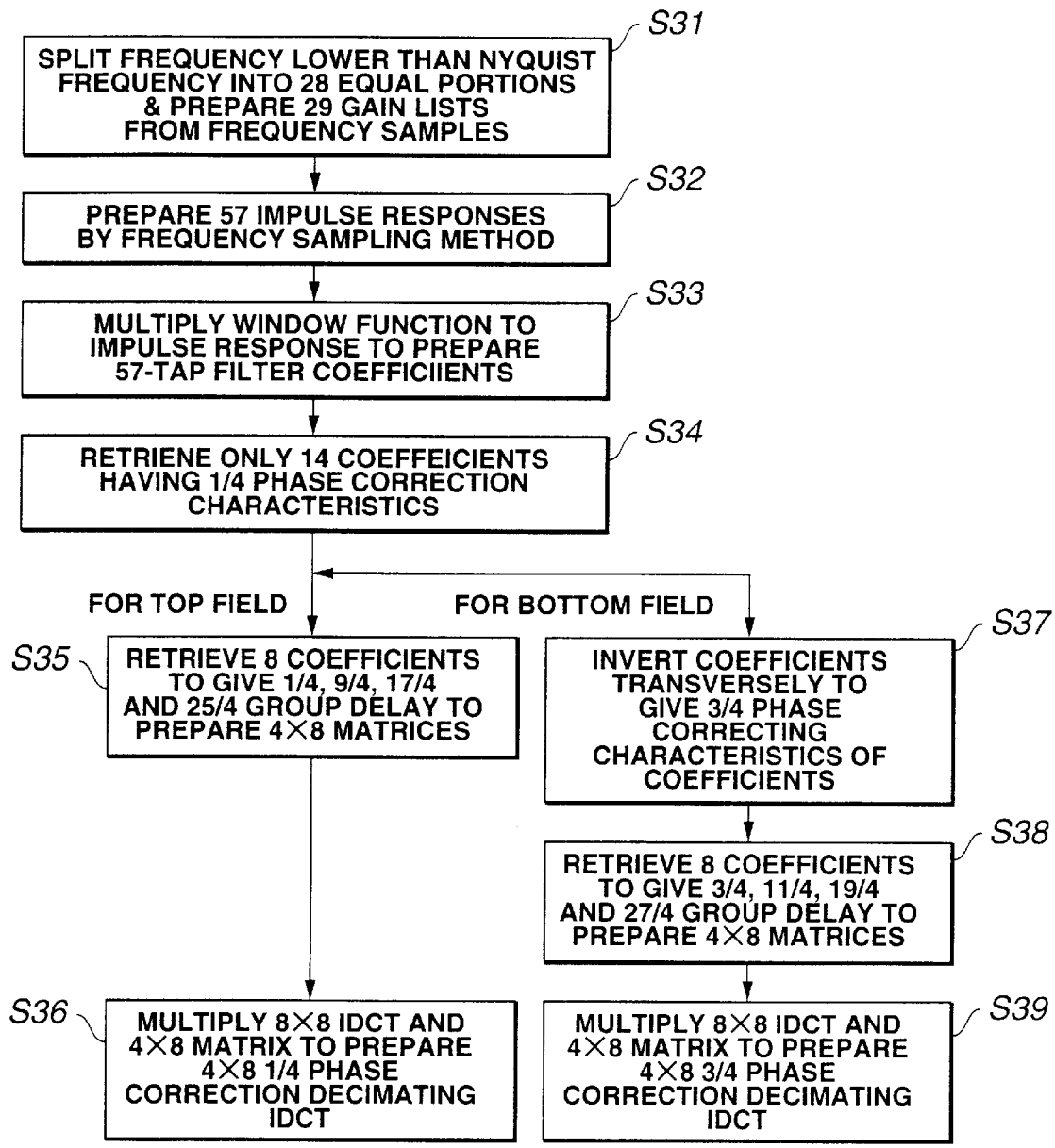
FIG. 36 is a flowchart for illustrating the designing sequence of a 4×8 phase-correcting IDCT matrix processed by the phase-correcting decimating IDCT apparatus for field mode.

FIG. 36 shows the designing procedure of the 4×8 phase correcting IDCT matrix, in which commutations are executed by the above-described phase-correcting decimating inverse discrete cosine transform unit for field mode 31. This 4×8 phase correcting IDCT matrix is hereinafter explained. This 4×8 phase correcting IDCT matrix is formulated by polyphase resolution of a prototype filter.

The picture decoding device 30 downdecodes the high resolution picture having the frequency response as shown in FIG. 37A to a standard resolution picture of a one-half resolution, having the frequency characteristics as shown in FIG. 37B. Thus, the frequency characteristics required of the prototype filter result from the 4-tupled oversampling, as shown in FIG. 37C, in order to obtain a pixel value of the ¼ phase of the standard resolution picture.

Figure 38:
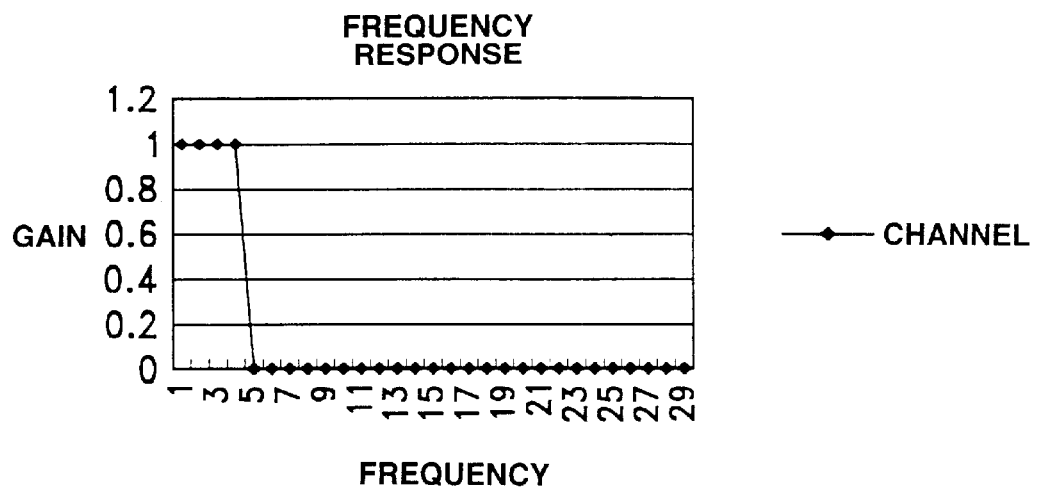
FIG. 38 illustrates a list of gains prepared from frequency samples obtained on splitting the frequency lower than the Nyquist frequency into equal $\{(N-1)/2\}$ portions.

First, at step S31, the Nyquist frequency and the lower frequency are divided into $\{(N-1)/2\}$ equal intervals, and a gain list is formulated from the frequency samples. For example, the Nyquist frequency and the lower frequency are divided into equal $(57-1)/2=28$ intervals to formulate 29 gain lists, as shown in FIG. 38.

Figure 39:
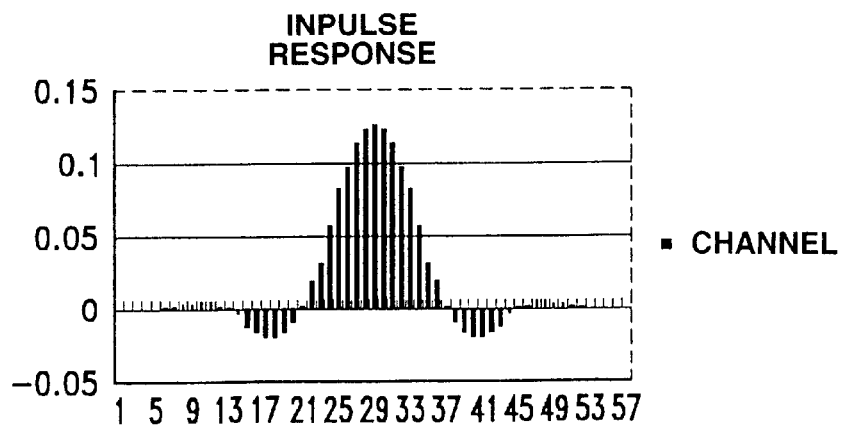
FIG. 39 illustrates an impulse response prepared on IDCTing the gain list.

Then, at step Storage unit 32, 57 impulse responses are formulated by the frequency sampling method. That is, 29 gain lists ate inverse discrete cosine transformed to formulate 57 FIR impulse responses. These 57 impulse responses are shown in FIG. 39.

Next, at step S33, these impulse responses are multiplied with a window function to formulate 57-tap filter coefficients $c1$ to $c57$.

The filter prepared at this step S33 serves as the prototype filter.

Then, at step S34, the prototype filter, having the 57 filter coefficients $c1$ to $c57$, is polyphase-resolved to retrieve only 14 filter coefficients $c'1$ to $c'14$ having the ¼ phase correction characteristics to formulate a polyphase filter.

Figure 40:
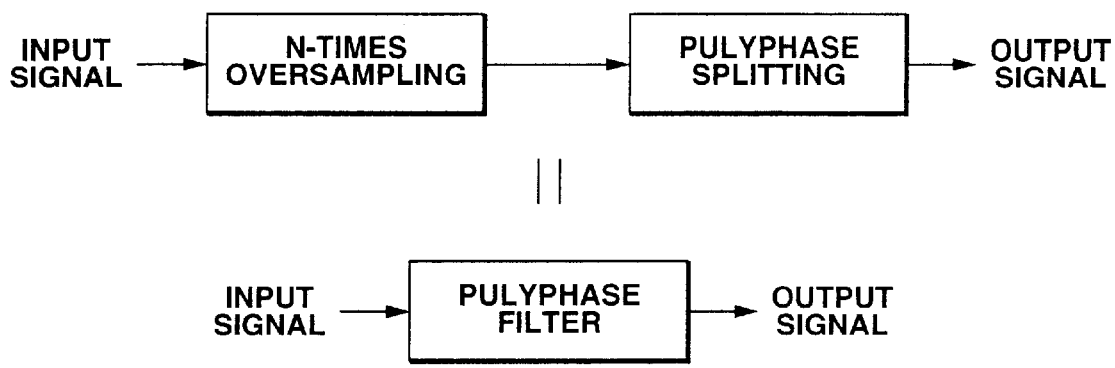
FIG. 40 illustrates a polyphase filter.
Figure 41:
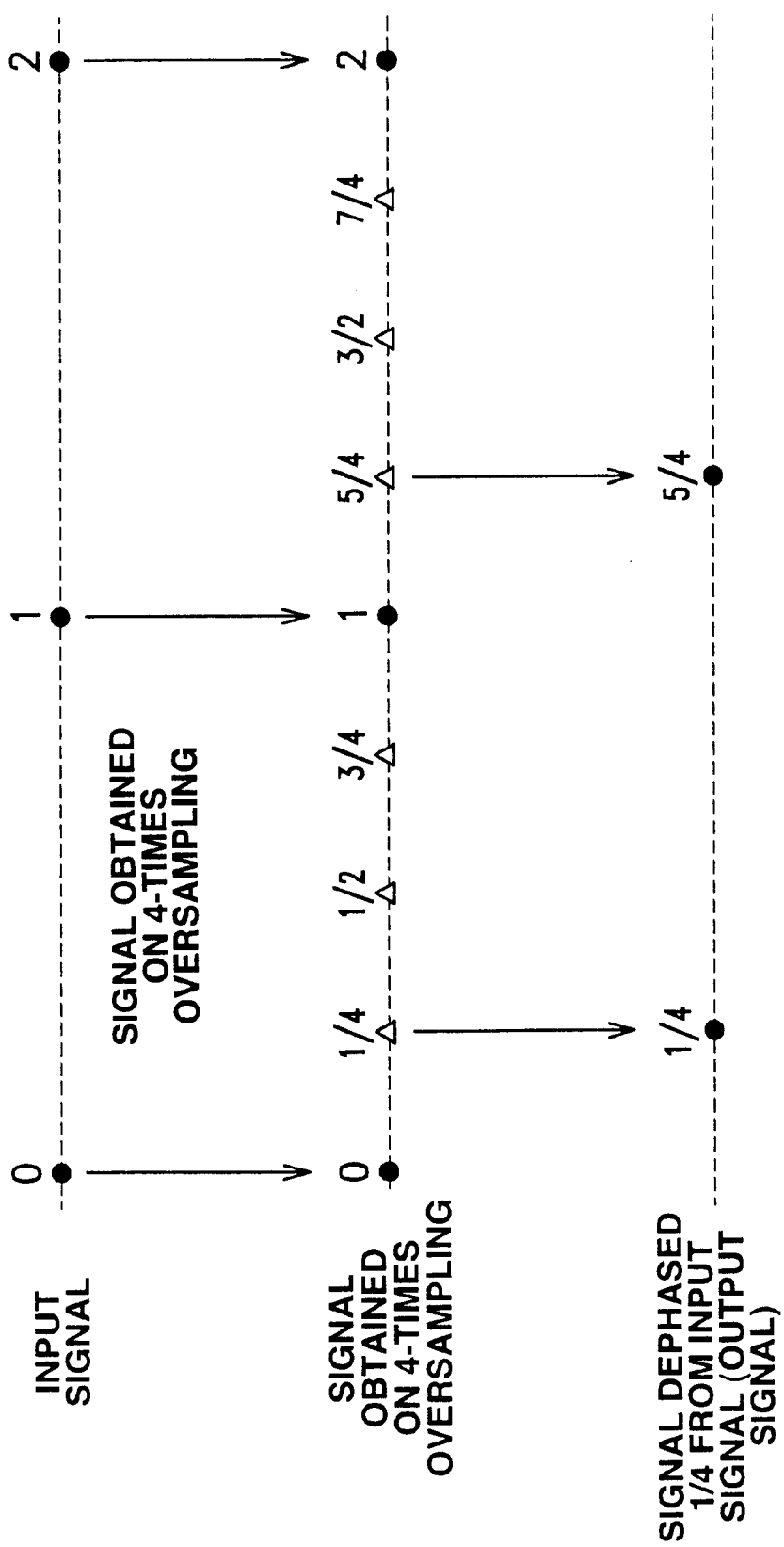
FIG. 41 illustrates a polyphase filter for outputting a signal dephased ¼ with respect to an input signal.

This polyphase filter is such a filter for oversampling an input signal to N times, and extracting pixels at an interval of N pixels from the oversampled signals, by way of polyphase resolution, for outputting signals dephased 1/N with respect to the input signal, as shown in FIG. 40. If desired to obtain a signal ¼ dephased with respect to the input signal, it suffices if the input signal is oversamples by a factor of four to retrieve a signal dephased by ¼ from the oversampled signal, as shown in FIG. 41.

Specifically, the 14 filter coefficients, formulated from the prototype filters $c1$ to $c57$ having 57 coefficients, are those having the following equation (3):

$$\begin{array}{ccccccc} -0.000413627 & 0.0039878 & 0.00229913 & -0.015080 & -0.00939227 & 0.0561242 & 0.119497 \\ 0.095091 & 0.0017216 & -0.0190084 & -0.00554409 & 0.00518009 & 0.0014488 & -0.00122162. \end{array} \quad (3)$$

After formulating the polyphase filter, the design processing is split between the 4×8 phase correction IDCT matrix for the top field and the 4×8 phase correction IDCT matrix for the bottom field.

Figure 42:
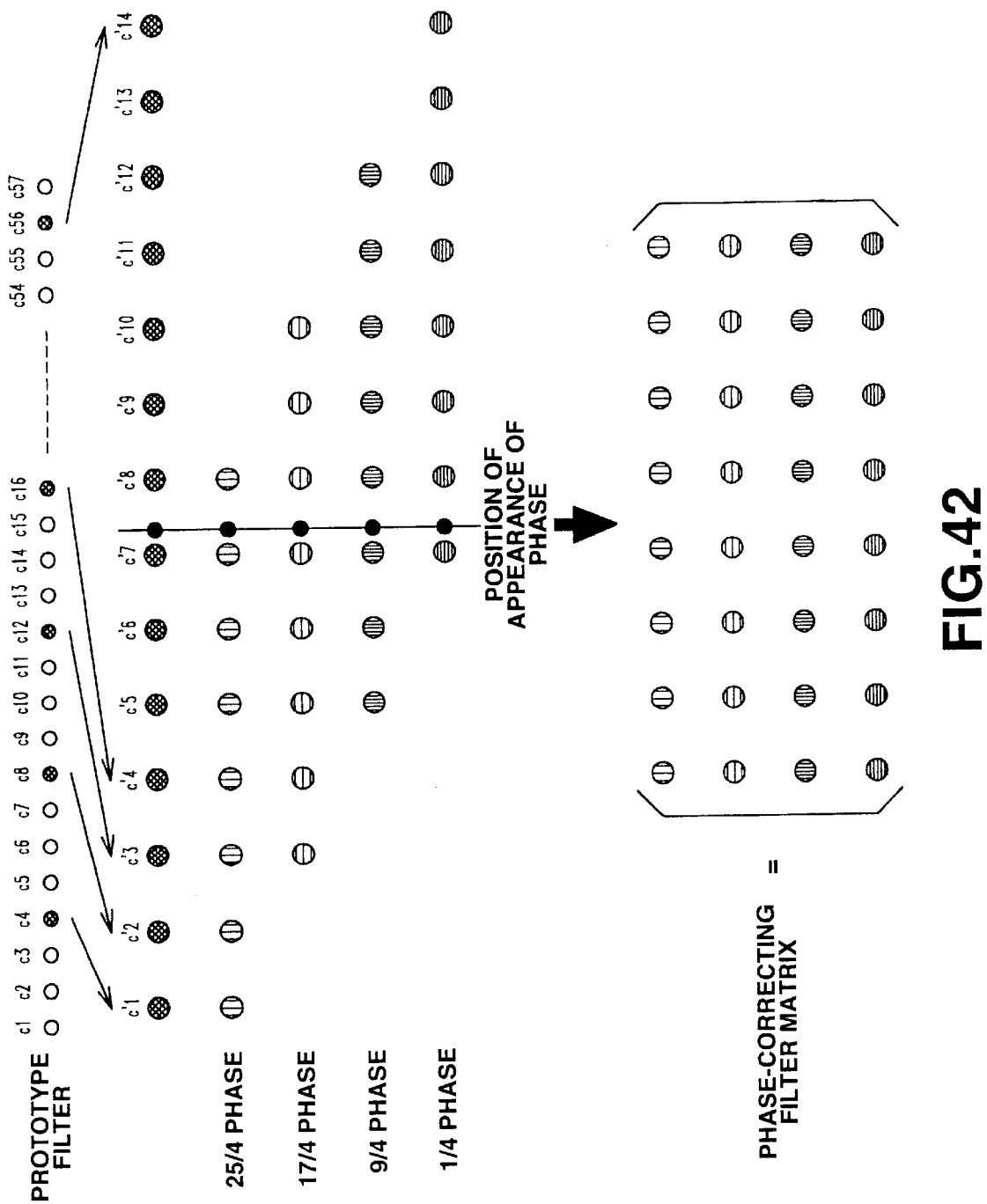
FIG. 42 illustrates a 4×8 phase-corrected IDCT matrix processed by the phase-correcting decimating IDCT apparatus for field mode.

First, in formulating the 4×8 phase correction IDCT matrix for the top field, eight coefficients with the group delay of ¼, 9/4, 17/4 and 25/4 phase are retrieved at step S35 from the polyphase-resolved 14 filter coefficients $c'1$ to $c'14$, so that the filter characteristics will be ¼ phase correction characteristics, to formulae a 4×8 phase correction filter matrix. The 4×8 phase correction filter matrix, this prepared, is shown in FIG. 42.

From the 14 filter coefficients c'1 to c'14 of the equation (3), the coefficients shown by the following equation (4) are retrieved:

$$
\begin{array}{l}
\text{25/4 phase} \\
\text{17/4 phase} \\
\text{9/4 phase} \\
\text{1/4 phase}
\end{array}
\begin{array}{llllllll}
-0.000413627 & 0.0039878 & 0.00229913 & -0.015080 & -0.00939227 & 0.0561242 & 0.119497 \\
 & & 0.00229913 & -0.015080 & -0.00939227 & 0.0561242 & 0.119497 \\
 & & & & -0.00939227 & 0.0561242 & 0.119497 \\
 & & & & & & 0.119497 \\
0.095091 \\
0.095091 & 0.017216 & -0.0190084 \\
0.095091 & 0.017216 & -0.0190084 & -0.00554409 & -0.00518009 \\
0.095091 & 0.017216 & -0.0190084 & -0.00554409 & -0.00518009 & 0.0014488 & -0.00122162
\end{array} \quad (4)
$$

If a 4×8 phase correcting IDCT matrix is found from the coefficients of the equation (4), a matrix shown in the following equation (5) is found:

$$
\begin{array}{llllllll}
0.119497 & 0.095091 & 0.017216 & -0.0190084 & -0.00554409 & 0.00518009 & 0.0014488 & -0.00122162 \\
-0.00939227 & 0.0561242 & 0.119497 & 0.095091 & 0.017216 & -0.0190084 & -0.00554409 & 0.00518009 \\
0.00229913 & -0.015080 & -0.00939227 & 0.0561247 & 0.119497 & 0.095091 & 0.017216 & -0.0190084 \\
-0.000413627 & 0.0039878 & 0.00229913 & -0.015080 & -0.00939227 & 0.0561242 & 0.119497 & 0.095091.
\end{array} \quad (5)
$$

If the 4×8 phase correcting IDCT matrix of the equation (5) is normalized, a matrix shown in the following equation (6) is obtained:

$$
\begin{array}{llllllll}
0.561919 & 0.447153 & 0.809559 & -0.0893847 & -0.0260704 & 0.0243587 & 0.0068128 & -0.00574453 \\
-0.0382407 & 0.216559 & 0.461087 & 0.368915 & 0.066429 & -0.0733453 & -0.0213923 & 0.0199877 \\
0.00931777 & -0.0611172 & -0.0380645 & 0.227457 & 0.484291 & 0.38538 & 0.069772 & -0.0770364 \\
-0.00164064 & 0.0158176 & 0.00911943 & -0.0598162 & -0.0372542 & 0.222615 & 0.473982 & 0.377176.
\end{array} \quad (6)
$$

At step S36, the 8×8 IDCT matrix is multiplied with this 4×8 phase correcting filter matrix to formulate a 4×8 phase correcting IDCT matrix for the top field.

The 4×8 phase correcting IDCT matrix, obtained on multiplying the 8×8 IDCT matrix with the 4×8 phase correcting filter matrix of the equation (6) is shown in the following equation (7):

$$
\begin{array}{llllllll}
0.353553 & 0.470989 & 0.376964 & 0.182877 & -0.0419176 & -0.0790523 & -0.0325452 & -0.0123689 \\
0.353553 & 0.249119 & -0.244534 & -0.39214 & -0.0586254 & 0.0447449 & 0.00293145 & 0.0032419 \\
0.353553 & -0.154747 & -0.424867 & 0.327667 & 0.101844 & -0.0599048 & 0.00729624 & -0.0053086 \\
0.353553 & -0.437751 & 0.267694 & -0.00183147 & -0.156649 & 0.0892455 & -0.0287812 & 0.0126261.
\end{array} \quad (7)
$$

For formulating a 4×8 phase correcting IDCT matrix for the bottom field, polyphase-resolved 14 filter coefficients c'1 to c'14 are inverted at step S37 in the left-and-right direction so that the filter coefficients will be ¾ phase correcting characteristics.

Then, at step S38, eight coefficients which will give the group delay of ¾, 11/4, 19/4 and 27/4 phase are retrieved at step S38 from the left-to-right inverted 14 filter coefficients c'1 to c'14 to formulate a 4×8 phase-correcting filter matrix.

Next, at step S39, the 8×8 IDCT matrix is multiplied with the 4×8 phase-correcting filter matrix to formulate a 4×8 phase correcting IDCT matrix for the bottom field.

By executing the processing of steps S31 to S39, it is possible to formulate a 4×8 phase correcting IDCT matrix worked on by the phase-correcting decimating inverse discrete cosine transform unit for field mode 31.

Figures 33A, 33B:
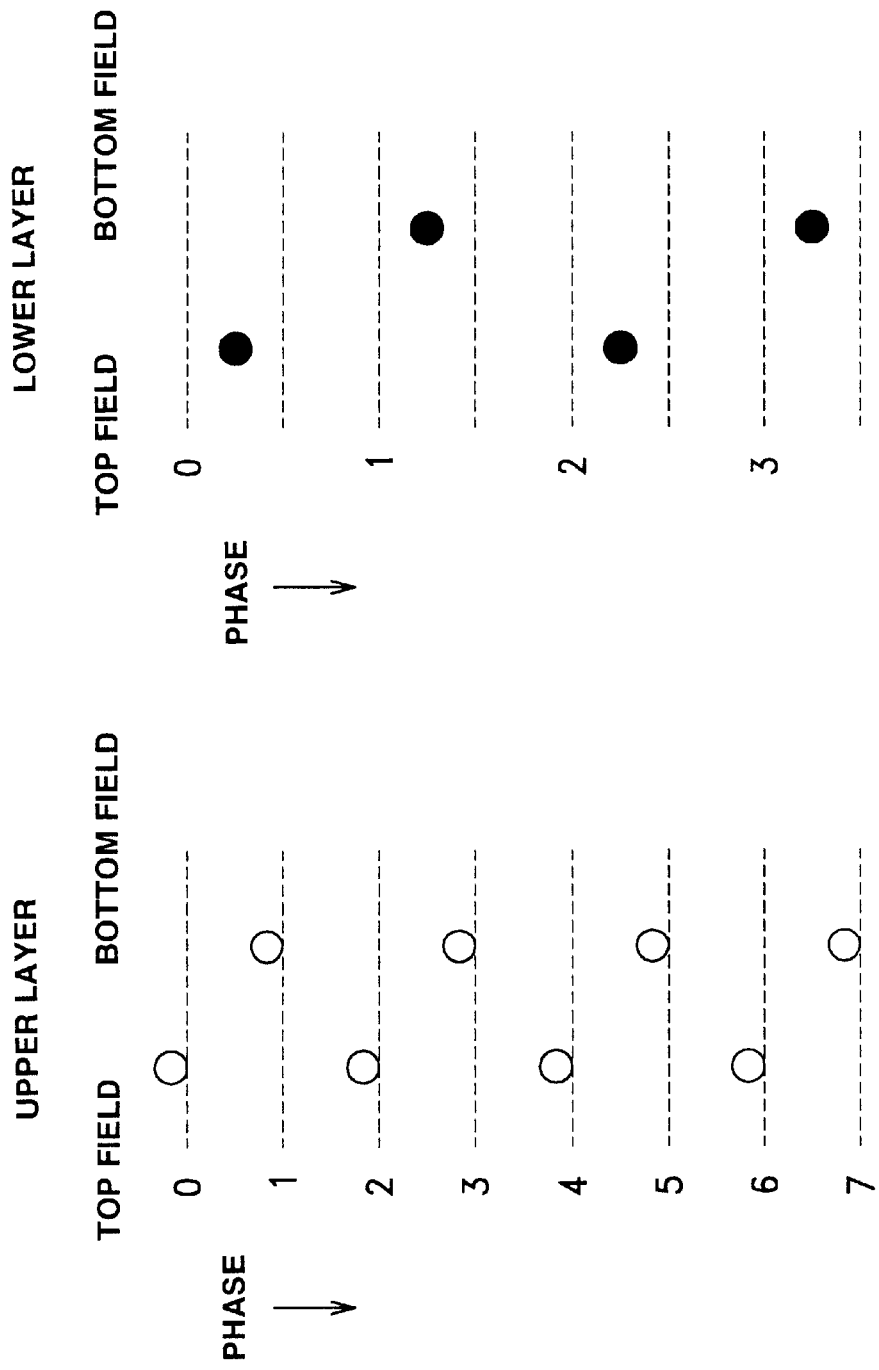
FIG. 33 illustrates the phase of pixels in the vertical direction of a reference picture stored in a frame memory of the second embodiment of the picture decoding apparatus.

By the phase-correcting decimating inverse discrete cosine transform unit for field mode 31 performing matrix processing on the 4×8 phase-correcting filter matrix and on the input DCT coefficients discrete cosine transformed with the field DCT mode, a standard resolution picture devoid of dephasing between the top and bottom field can be produced on decoding. That is, with the phase-correcting decimating inverse discrete cosine transform unit for field mode 31, it is possible to generate a standard resolution picture (lower layer) which will give the phases in the vertical direction of the respective pixels of the top field of ¼, 9/4, . . . and the phases in the vertical direction of the respective pixels of the bottom field of 5/4, 13/4, . . . , as shown in FIG. 33.

The processing contents of the phase-correcting decimating inverse discrete cosine transform unit for frame mode 32 are explained in further detail.

Figure 43:
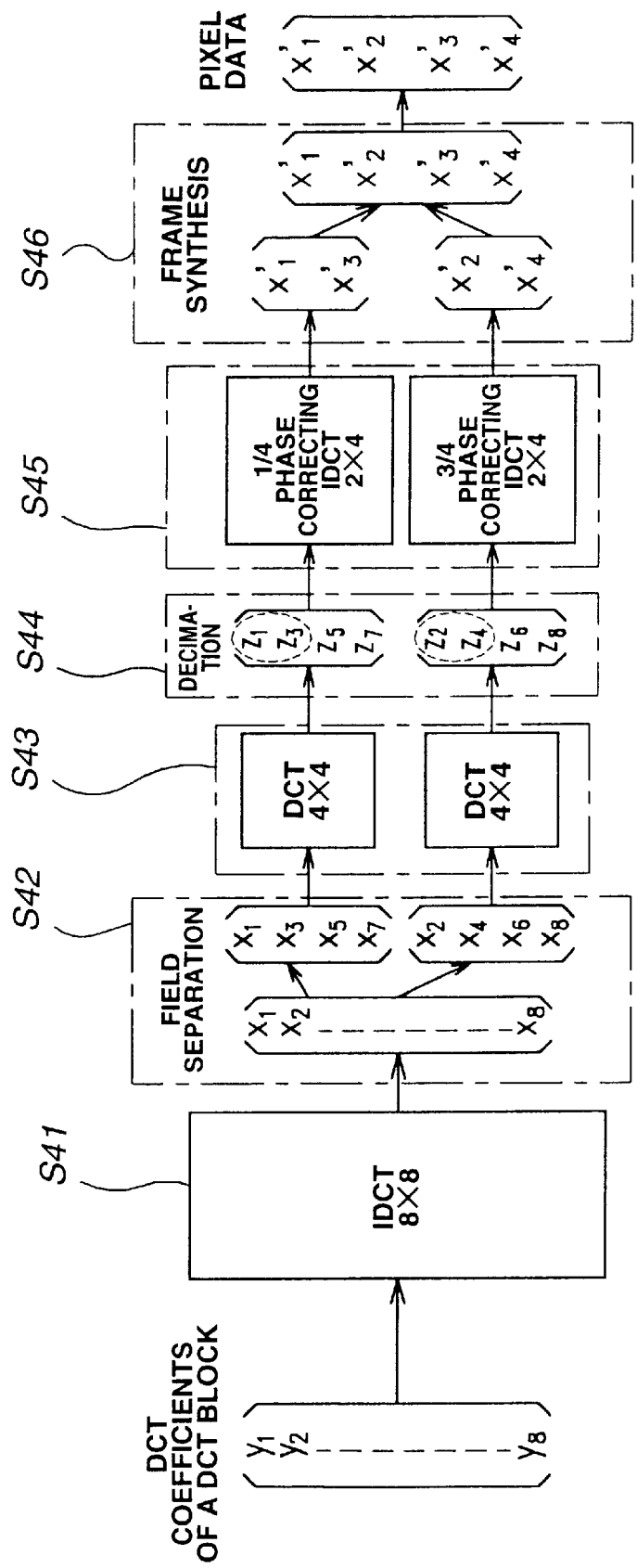
FIG. 43 illustrates the processing contents of the phase-corrected IDCT matrix processed by the phase-correcting decimating IDCT apparatus for frame mode of the second embodiment of the picture decoding apparatus.

The phase-correcting decimating inverse discrete cosine transform unit for frame mode 32 is fed with a bitstream, obtained on compression coding high-resolution picture, is inputted on the DCT block basis, as shown in FIG. 43.

First, at step S41, 8×8 inverse discrete cosine transform is applied to discrete cosine coefficients y of the sole DCT block. Then, at step S42, the 8×8 pixel data are field-separated into two pixel blocks. Then, at step S43, 4×4 discrete cosine transform is applied to each of the field-separated two pixel blocks. Next, at step S44, high-frequency components of the discrete cosine coefficients z of the respective pixel blocks are thinned out to give pixel blocks each made up of 2×2 discrete cosine coefficients. The processing as from the step S41 to the step S44 is the same as that from step S1 to step S4 for the processing shown in FIG. 13.

Then, at step S45, inverse discrete cosine transform, correcting the pixel dephasing in the vertical direction, is performed on the pixel block corresponding to the top field, using a 2×4phase correcting IDCT matrix adapted for performing ¼ pixel phase correction. On the other hand, inverse discrete cosine transform, correcting the pixel dephasing in the vertical direction, is performed on the pixel block corresponding to the bottom field, using a 2×4 phase correcting IDCT matrix adapted for performing for ¾ pixel phase correction. By performing the above-described decimating inverse discrete cosine transform, it is possible to produce 2×2 pixel data x', it being noted that pixel data in the vertical direction, among the totality of the pixel data of the pixel block corresponding to the top field, are denoted as $x'_1$ and $x'_3$, with pixel data in the vertical direction, among the totality of the pixel data of the pixel block corresponding to the bottom field, being denoted as $x'_2$, $x'_4$ in the drawing. These pixel data x' give a standard resolution picture (lower layer) in which the phases in the vertical direction of the respective pixels of the top field are ¼, 9/4 and those in the vertical direction of the respective pixels of the bottom field are 5/4, 13/4. The method for designing the 2×4 phase correcting IDCT matrix will be explained subsequently in detail.

Then, at step S46, pixel data of the pixel block corresponding to the top field and pixel data of the pixel block corresponding to the bottom field are synthesized to a frame. The processing at step S46 is the same as the processing at step S6 in the one-block processing shown in FIG. 13.

By performing the processing of steps S41 to S46, the phase-correcting decimating inverse discrete cosine trans-form unit for frame mode 32 is able to generate a picture free of phase deviation between respective pixels. On the other hand, the phase-correcting decimating inverse discrete cosine transform unit for field mode 31 is able to generate a picture free of dephasing with respect to the picture obtained on decoding by the phase-correcting decimating inverse discrete cosine transform unit for field mode 31.

It is also possible for the phase-correcting decimating inverse discrete cosine transform unit for frame mode 32 to execute the processing from step S41 to step S46 using a sole matrix.

Figure 44:
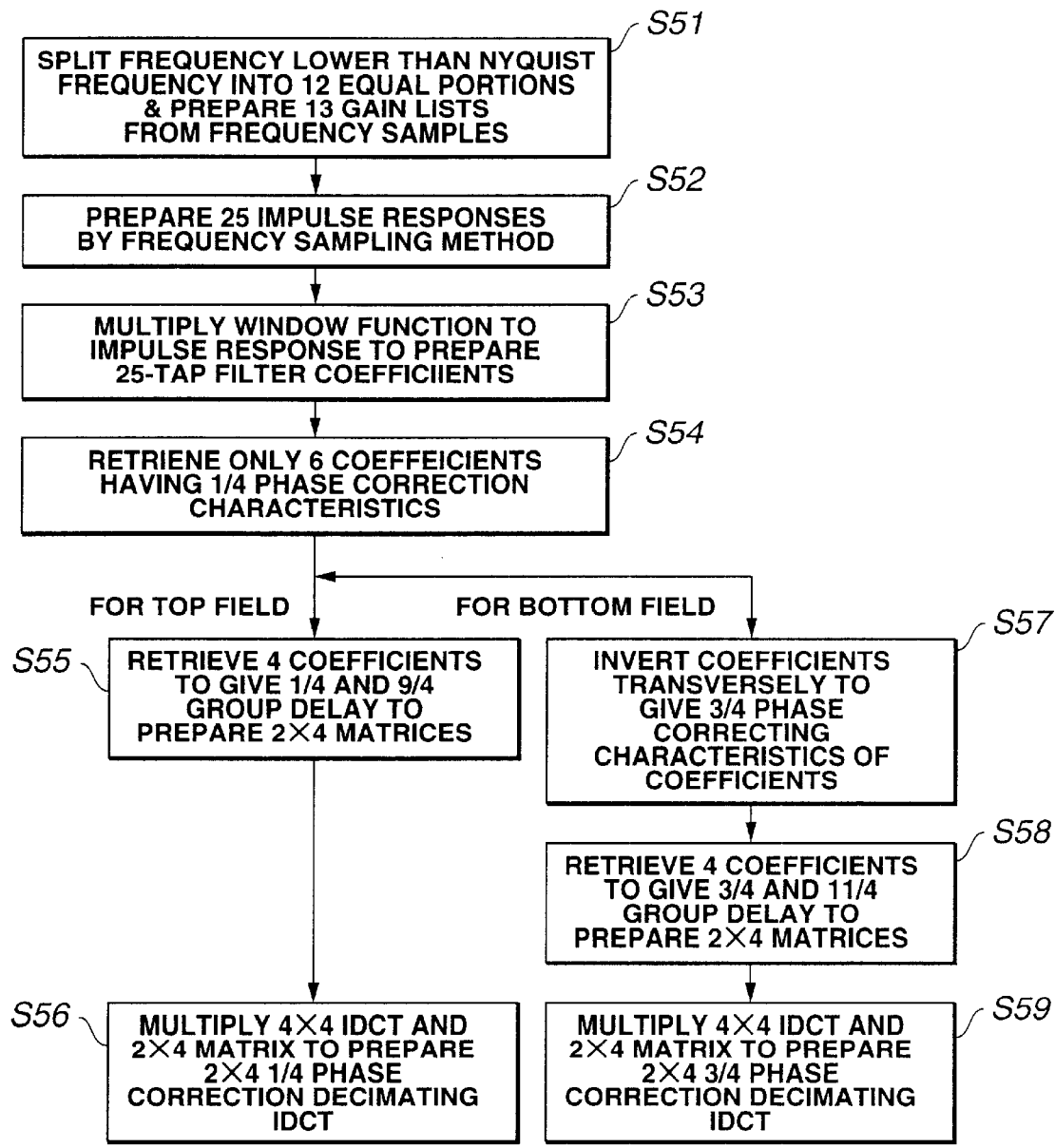
FIG. 44 is a flowchart for illustrating the designing sequence of a 2×4 phase-corrected IDCT matrix processed by the phase-correcting decimating IDCT apparatus for frame mode.

The designing procedure for the 2×4 phase correcting IDCT matrix, processed at step S45 of the phase-correcting decimating inverse discrete cosine transform unit for frame mode 32, is shown in FIG. 44. This 2×8 phase correcting IDCT matrix is now explained.

Figure 45:
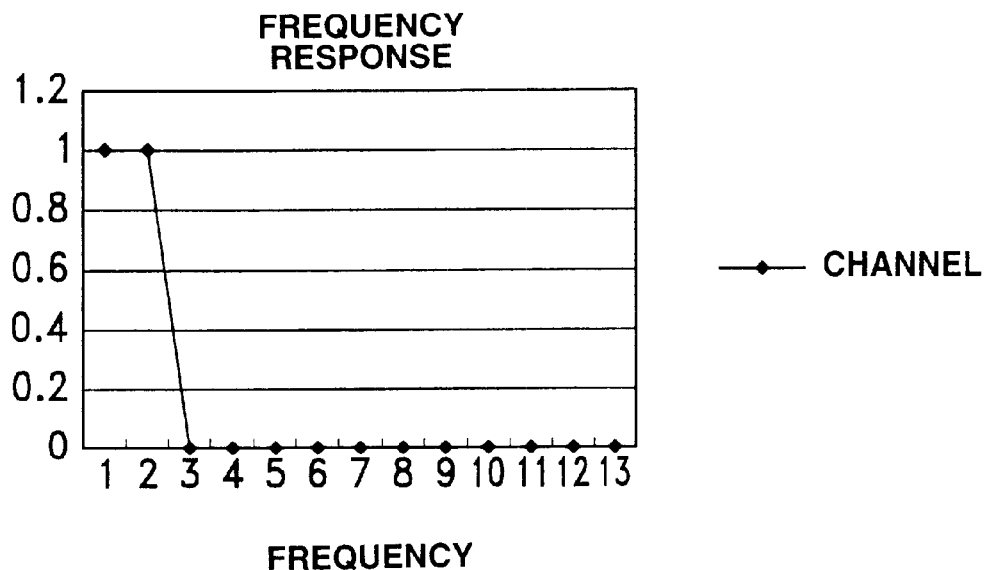
FIG. 45 illustrates a gain list prepared from frequency samples obtained on splitting the frequency range lower than the Nyquist frequency into equal $\{(N-1)/2\}$ portions.

First, at step S51, the Nyquist frequency and the lower frequency are divided into {(N−1)/2} equal intervals, and gain lists are formulated from the frequency samples. For example, the Nyquist frequency and the lower frequency are divided into equal (25−1)/2=12 intervals to formulate 13 gain lists, as shown in FIG. 45.

Figure 46:
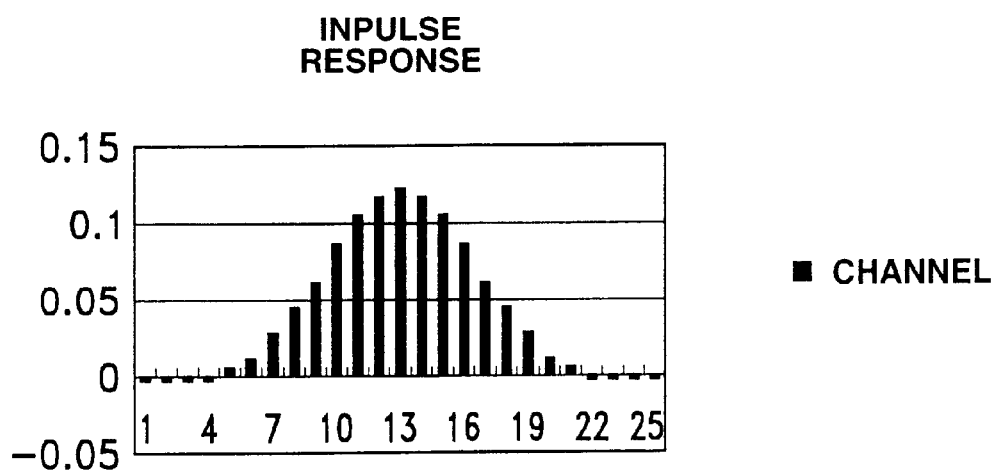
FIG. 46 illustrates the impulse response prepared on IDCTing the gain list.

Then, at step S52, 25 impulse responses are formulated by the frequency sampling method. That is, 13 gain lists are inverse discrete cosine transformed to formulate 25 FIR impulse responses. These 25 impulse responses are shown in FIG. 46.

Next, at step S53, these impulse responses are multiplied with a window function to formulate 25-tap filter coefficients c1 to c25.

The filter prepared at this step S53 serves as the prototype filter.

Then, at step S54, the prototype filter, having the 25 filter coefficients c1 to c25, is polyphase-resolved to retrieve only 6 filter coefficients c'1 to c'6 having the ¼ phase correction characteristics to formulate a polyphase filter.

Specifically, the 14 filter coefficients, formulated from the prototype filters c1 to c25, having 25 coefficients, are as shown in the following equation (8):

$$-0.00236073 \quad 0.042655 \quad 0.115645 \quad 0.0850711 \quad 0.0105276 \quad 0.00328948 \tag{8}$$

In this manner, the designing processing is split, after formulating the polyphase filter, into a 2×4 phase-correcting IDCT matrix for the top field and a 2×4 phase-correcting IDCT matrix for the bottom field.

Figure 47:
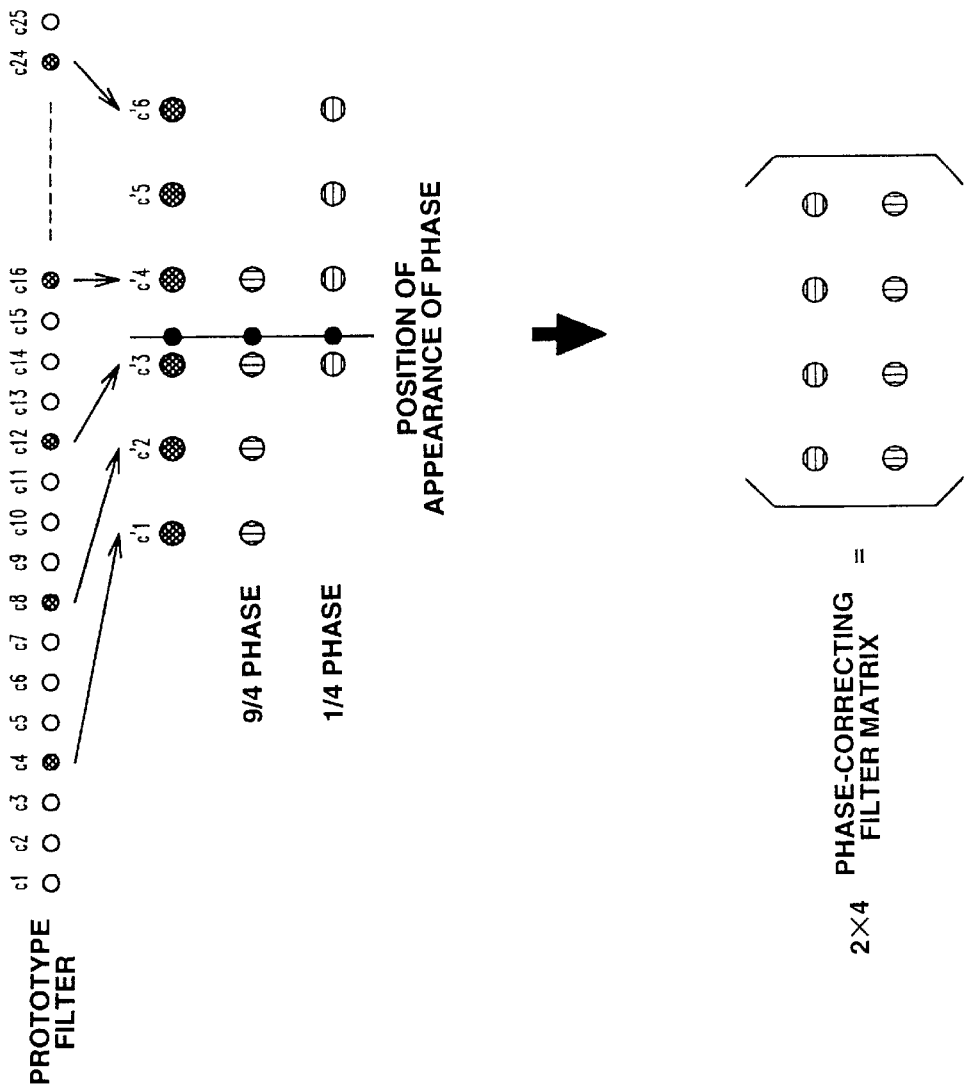
FIG. 47 illustrates a 2×4 phase-corrected IDCT matrix processed by the phase-correcting decimating IDCT apparatus for frame mode.

First, in formulating the 2×4 phase-correcting IDCT matrix for the top field, two coefficients are retrieved from each of the six polyphase-resolved filter coefficients c'1 to c'6, so that the group delay will be ¼ and 9/4, respectively, to formulate a 2×4 phase-correcting filter matrix. The 2×4 phase-correcting filter matrix, thus formulated, is shown in FIG. 47.

For example, from the six filter coefficients c'1 to c'6 of the equation (8), the coefficients shown by the following equation (9) are retrieved:

$$\begin{array}{llllll} 9/4 \text{ phase} & -0.00236073 & 0.042655 & 0.115645 & 0.0850711 & \\ 1/4 \text{ phase} & & & 0.115645 & 0.0850711 & 0.0105276 & 0.00328948. \end{array} \tag{9}$$

If a 2×4 phase-correcting filter matrix is found from the coefficients of the equation (9), the matrix indicated by the following equation (10) is obtained:

$$\begin{array}{llll} 0.115645 & 0.0850711 & 0.0105276 & 0.00328948 \\ -0.00236073 & 0.042655 & 0.115645 & 0.0850711. \end{array} \tag{10}$$

If the 2×4 phase-correcting filter matrix, shown by the equation (10), is normalized, the matrix shown by the following equation (11) is obtained:

$$\begin{array}{llll} 0.556108 & 0.409085 & 0.0506245 & -0.0158183 \\ -0.00979515 & 0.176984 & 0.479834 & 0.352977. \end{array} \tag{11}$$

At step S56, the 4×4 IDCT matrix is multiplied with this 2×4 phase-correcting filter matrix to formulate a 2×4 phase-correcting IDCT matrix for the top field.

The 2×4 phase-correcting IDCT matrix, obtained on multiplying the 2×4 IDCT matrix with the 2×4 phase-correcting filter indicated by the above equation (11), is as shown in the following equation (12):

$$\begin{array}{cccc} 0.5 & 0.470628 & 0.0402901 & -0.0794137 \\ 0.5 & -0.318943 & -0.156819 & 0.0996811. \end{array} \quad (12)$$

On the other hand, in formulating a 2×4 phase-correcting IDCT matrix for the bottom field, the six polyphase-resolved filter coefficients c'1 to c'6 are inverted at step S57 in the left-and-right direction so that the filter coefficients will be of the ¾ phase correcting characteristics.

Then, at step S58, two coefficients are retrieved from each of the six polyphase-resolved filter coefficients c'1 to c'6, so that the group delay will be ¾ and 11/4, respectively, to formulate a 2×4 phase-correcting filter matrix.

At step S59, the 4×4 IDCT matrix is multiplied at step S59 with the 2×4 phase-correcting filter matrix to formulate the phase-correcting filter matrix for the bottom field.

By performing the processing of the steps S51 to S59 as described above, it is possible to formulate the 2×4 phase-correcting filter matrix which the phase-correcting decimating inverse discrete cosine transform unit for frame mode 32 uses to perform the computations at step S45.

Thus, with the picture decoding device 30 according to the second embodiment of the present invention, 4×4 decimating IDCT is applied to the top and bottom fields, for the field DCT mode, with the top and bottom fields being phase-corrected to decode a picture of standard resolution. For the frame DCT mode, a picture of standard resolution is decoded on frame separation and decimating IDCT followed by phase correction. In the picture decoding device 30, in which processing is performed separately for the field and frame DCT modes, there is no risk of loss of properties inherent in a picture obtained on interlaced scanning, while phase deviation between the top and bottom fields, produced on decimating IDCT, is eliminated to prevent deterioration of the output picture quality. That is, in the present picture decoding device 30, since there is no necessity for performing phase correction when outputting a decoded picture stored in the frame memory 17, thus simplifying the processing without deteriorating the picture quality.

The processing in the phase-correcting decimating inverse discrete cosine transform unit for frame mode 32 is now explained in further detail.

The phase-correcting decimating inverse discrete cosine transform unit for field mode 31 performs decimating IDCT on 4×4 coefficients, whereas the phase-correcting decimating inverse discrete cosine transform unit for frame mode 32 performs decimating IDCT on 4×8 coefficients. Thus, if, in the picture decoding device 30, a large number of DCT blocks of the frame DCT mode are contained in the input bitstream, the processing volume is increased. Therefore, in the present picture decoding device 30, the processing volume of the phase-correcting decimating inverse discrete cosine transform unit for frame mode 32 may be diminished, depending on its processing capability, as in the decimating IDCT device for picture decoding device 10 of the first embodiment described above.

The phase-correcting decimating inverse discrete cosine transform unit for frame mode 32 performs processing from step S41 to step S46, shown in FIG. 43, after substitution of 0s for the 4×2 coefficients of the high frequency components of the vertical direction, among the 4×8 DCT coefficients, as shown for example, in FIG. 26. The processing volume is decreased by substituting 0s for certain coefficients. Since the processing steps remain unchanged without regard to whether or not 0s are substituted for certain coefficients, thus not leading to errors due to phase differences.

In the phase-correcting decimating inverse discrete cosine transform unit for frame mode 32, 0s may be substituted for 4×2 coefficients of the mid frequency components in the vertical direction, as shown in FIG. 27, or for 4×4 coefficients of the mid frequency components of the vertical direction, as shown in FIG. 28, instead of for the coefficients shown in FIG. 26.

In the phase-correcting decimating inverse discrete cosine transform unit for frame mode 32, it is also possible to detect, by the bitstream analysis circuit 11, whether the DCT block being processed is an I-picture, a P-picture or a B-picture, and to switch between doing decimating IDCT on all 4×8 coefficients and substituting 0s for certain coefficients after substituting 0s for certain coefficients, based on the detected information.

For example, in the phase-correcting decimating inverse discrete cosine transform unit for frame mode 32, since picture quality deterioration in the I- and P-pictures is propagated to other pictures, all of the 4×8 coefficients of the I- and P-pictures are decimating IDCTed and, since picture quality deterioration in the B-picture is not propagated to other pictures, decimating IDCT is performed after substituting 0s for certain coefficients for the B-picture to diminish the processing volume. The parameters referred to in switching for curtailing the processing volume may be the information on whether data to be processed is the luminance or chroma signal or the information on whether data to be processed belongs to the intra-macro-block or to the inter-macro-block.

Thus, in the picture decoding device 30, it is possible to substitute 0s for part of the coefficients to be IDCTed to suppress picture quality deterioration to the minimum to curtail the processing volume.

Also, in the present picture decoding device 30, as in the first embodiment, described above, the reduction in the processing volume by the variable length decoding device 12 may be combined with that by the phase-correcting decimating inverse discrete cosine transform unit for frame mode 32 to curtail the processing volume efficiently. For example, in the variable length decoding device 12, the DCT coefficients may be back-scanned, in agreement with the coefficients set to zero by the phase-correcting decimating inverse discrete cosine transform unit for frame mode 32, whilst the number of the coefficients to be back-scanned may be varied in agreement with the coefficients set to 0 by the decimating DCT device for frame mode 15, to realize efficient processing.

Although the present invention has been described above in connection with the first and second embodiment, the data processed by the present invention is not limited to picture data of the MPEG2 system. That is, the data may be any data of the first resolution, such as data obtained on prediction coding by motion prediction on a pixel block basis or data obtained on orthogonal transform on the pixel block basis. For example, the data may be compressed picture data obtained on wavelet transform.

What is claimed is:

1. A picture decoding apparatus for decoding, from compressed picture data of a first resolution, moving picture data of a second resolution lower than said first resolution, said compressed picture data of the first resolution having been obtained by predictive coding by performing motion prediction in terms of a pre-set pixel block (macro-block) as a unit and orthogonal transform in terms of a pre-set pixel block (macro-block) as a unit, comprising:

first inverse orthogonal transform means for inverse orthogonal transforming an orthogonal transform block of said compressed picture data, obtained on orthogonal transforming in accordance with an orthogonal transform system associated with interlaced scanning (field orthogonal transform mode); and second inverse orthogonal transform means for inverse orthogonal transforming an orthogonal transform block of said compressed picture data, obtained on orthogonal transforming in accordance with an orthogonal transform system associated with sequential scanning (frame orthogonal transform mode);

said second inverse orthogonal transform means setting certain coefficients of the frequency components in the vertical direction of said orthogonal transform block to zero, inverse orthogonal transforming the coefficients of the totality of the frequency components of the orthogonal transform block, certain coefficients of which have been set to 0, separating pixels of the inverse orthogonal transformed orthogonal transform block into two pixel blocks associated with interlaced scanning, orthogonal transforming the separated two pixel blocks, inverse orthogonal transforming the coefficients of low frequency components of the orthogonal transformed two pixel blocks and synthesizing the two inverse orthogonal transformed pixel blocks to generate an orthogonal transform block.

2. The picture decoding apparatus according to claim 1 wherein said second inverse orthogonal transform means sets two high range pixels in the vertical direction, two mid-range pixels in the vertical direction or four mid-range pixels in the vertical direction of an orthogonal transform block, made up of 8 horizontal pixels and 8 vertical pixels (8×8 pixel block), to zero.

3. The picture decoding apparatus according to claim 1 wherein said second inverse orthogonal transform means sets certain frequency components in the vertical direction to zero depending on the contents of the orthogonal transform block to be decoded.

4. The picture decoding apparatus according to claim 1 further comprising:

variable length decoding means for back-scanning coefficients in said orthogonal transform block in accordance with a pre-set scanning system for variable length decoding variable length encoded compressed picture data of the first resolution;

said variable length decoding means variable length decoding up to the coefficient of the highest frequency among the coefficients of low frequency components to be inverse orthogonal transformed, said variable length decoding means not variable length decoding higher frequency components.

5. A picture decoding method for decoding, from compressed picture data of a first resolution, moving picture data of a second resolution lower than said first resolution, said compressed picture data of the first resolution having been obtained by predictive coding by performing motion prediction in terms of a pre-set pixel block (macro-block) as a unit and orthogonal transform in terms of a pre-set pixel block (macro-block) as a unit, comprising:

inverse orthogonal transforming an orthogonal transform block of said compressed picture data, obtained on orthogonal transforming in accordance with an orthogonal transform system associated with interlaced scanning (field orthogonal transform mode); and inverse orthogonal transforming an orthogonal transform block of said compressed picture data, obtained on orthogonal transforming in accordance with an orthogonal transform system associated with sequential scanning (frame orthogonal transform mode);

wherein certain coefficients of the frequency components in the vertical direction of said orthogonal transform block are set to zero, the coefficients of the totality of the frequency components of the orthogonal transform block, certain coefficients of which have been set to 0, are inverse orthogonal transformed, pixels of the inverse orthogonal transformed orthogonal transform block are separated into two pixel blocks associated with interlaced scanning, the separated two pixel blocks are orthogonal transformed, the coefficients of low frequency components of the orthogonal transformed two pixel blocks are inverse orthogonal transformed and the two inverse orthogonal transformed pixel blocks are synthesized to generate an orthogonal transform block.

6. The picture decoding method according to claim 5 wherein said two high range pixels in the vertical direction, two mid-range pixels in the vertical direction or four mid-range pixels in the vertical direction of an orthogonal transform block, made up of 8 horizontal pixels and 8 vertical pixels (8×8 pixel block), are set to zero.

7. The picture decoding method according to claim 5 wherein certain frequency components in the vertical direction are set to zero depending on the contents of the orthogonal transform block to be decoded.

8. The picture decoding method according to claim 5 further comprising:

back-scanning coefficients in said orthogonal transform block in accordance with a pre-set scanning system for variable length decoding variable length encoded compressed picture data of the first resolution;

wherein up to the coefficient of the highest frequency among the coefficients of low frequency components to be inverse orthogonal transformed are variable length decoded, without higher frequency components being decoded.

* * * * *